(12) United States Patent
Querejeta Masaveu et al.

(10) Patent No.: US 11,080,929 B2
(45) Date of Patent: Aug. 3, 2021

(54) COMPUTER-IMPLEMENTED METHOD AND A SYSTEM FOR GENERATING A 3D PATH TO A LANDING LOCATION FOR AN AERIAL VEHICLE

(71) Applicant: The Boeing Company, Chiacgo, IL (US)

(72) Inventors: Carlos Querejeta Masaveu, Madrid (ES); Ernesto Valls Hernandez, Madrid (ES); Francisco A. Navarro Felix, Madrid (ES)

(73) Assignee: The Boeing Company, Chicago, IL (US)

( * ) Notice: Subject to any disclaimer, the term of this patent is extended or adjusted under 35 U.S.C. 154(b) by 258 days.

(21) Appl. No.: 16/157,766

(22) Filed: Oct. 11, 2018

(65) Prior Publication Data
US 2019/0108680 A1    Apr. 11, 2019

(30) Foreign Application Priority Data

Oct. 11, 2017    (EP) .................................... 17382676

(51) Int. Cl.
*G06T 19/00*    (2011.01)
*G06T 17/00*    (2006.01)
(Continued)

(52) U.S. Cl.
CPC .......... *G06T 19/003* (2013.01); *G01C 21/005* (2013.01); *G01C 23/00* (2013.01);
(Continued)

(58) Field of Classification Search
CPC .......................... G06F 16/5838; G06T 10/003
See application file for complete search history.

(56) References Cited

U.S. PATENT DOCUMENTS 9,542,849 B1    1/2017    Bertram et al.
9,997,080 B1 *  6/2018    Chambers ............ G08G 5/0034
(Continued)

OTHER PUBLICATIONS

European Patent Office, "European Search Report," issued in connection with application Apr. 20, 2018, Issued in connection with application No. 17382676.9-1003, 5 pages.
(Continued)

*Primary Examiner* — Jess Whittington
(74) *Attorney, Agent, or Firm* — Hanley, Flight & Zimmerman, LLC

(57) ABSTRACT

A system and a method for generating a 3D path from a source to a destination for an aerial vehicle is disclosed. An example system includes a managing unit to select a group of altitude layers including source and destination and generate a 2D horizontal scenario by identifying constraints to avoid at each altitude layer. The example system includes a path computing unit to determine common constraints for the altitude layers of the 2D horizontal scenario and compute a 2D lateral path avoiding the common constraints. The managing unit generates a 2D vertical scenario based on a projection of the previously computed 2D lateral path onto the constraints at the altitude layers. The path computing unit computes a 2D vertical path avoiding constraints of the 2D vertical scenario. The managing unit composes 3D waypoints of a conflict-free 3D path according to the 2D lateral path and 2D vertical path.

20 Claims, 14 Drawing Sheets

(51) Int. Cl.
    *G05D 1/02*     (2020.01)
    *G01C 23/00*     (2006.01)
    *G06F 16/583*     (2019.01)
    *G08G 5/00*     (2006.01)
    *G01C 21/00*     (2006.01)

(52) U.S. Cl.
    CPC ....... *G05D 1/0202* (2013.01); *G06F 16/5838* (2019.01); *G06T 17/00* (2013.01); *G08G 5/006* (2013.01); *G08G 5/0034* (2013.01); *G08G 5/0039* (2013.01); *G08G 5/0052* (2013.01); *G08G 5/0069* (2013.01); *G08G 5/0086* (2013.01); *G06T 2200/04* (2013.01)

(56) References Cited

U.S. PATENT DOCUMENTS

| | | |
|---|---|---|
| 2014/0142787 A1 | 5/2014 | Tittlotson et al. |
| 2016/0284221 A1* | 9/2016 | Hinkle ................. G08G 5/0069 |
| 2018/0204469 A1* | 7/2018 | Moster ................. B64C 39/024 |
| 2019/0019423 A1* | 1/2019 | Choi ..................... G01S 13/933 |

OTHER PUBLICATIONS

Frontera Guillermo et al..: "Approximate 3D Euclidean Shortest Paths for Unmanned Aircraft in Urban Environments", Journal of Intelligent and Robotic Systems, Kluwer Dordrecht, NL, vol. 85, No. 2, Aug. 1, 2016 (Aug. 1, 2016), pp. 353-368, XP036141112, ISSN: 0921-0296, DOI: 10.1007/S10846-016-0409-1, 16 pages.

Cuciniello G et al.: "Real Time Optimal Path Generation with Mission and Vehicle Maneuvering Constraints," 2017 Workshop on Research, Education and Development of Unmanned Aerial Systems (RED-UAS), IEEE, Oct. 3, 2017 (Oct. 3, 2017), pp. 31-36, XP033249201, DOI: 10.1109/RED-UAS.2017.8101639 [retrieved on Nov. 8, 2017], 6 pages.

European Patent Office, "Communication Pursuant to Article, 94(3) EPC," issued in connection with application May 2, 2018, issued in connection with application No. 17382676.9-1003, 10 pages.

\* cited by examiner

COMPUTER-IMPLEMENTED METHOD AND A SYSTEM FOR GENERATING A 3D PATH TO A LANDING LOCATION FOR AN AERIAL VEHICLE

RELATED APPLICATION

This patent arises from an application claiming the benefit of European Patent Application Serial No. EP17382676, which was filed on Oct. 11, 2017. European Patent Application Serial No. EP17382676 is hereby incorporated herein by reference in its entirety. Priority to European Patent Application Serial No. EP17382676 is hereby claimed.

FIELD

The present disclosure generally teaches techniques related to path finding for aerial vehicles (AVs) avoiding obstacles or restricted areas. In particular, these techniques are useful for planning a mission or generating a contingency plan during flight for an AV.

BACKGROUND

One of the key tasks of mission flight planning is the generation of a route describing the path to be followed by an AV when flying. The path is composed of waypoints to which the AV is to pass and needs to comply with safety and regulatory considerations, such as terrain obstacles, restricted areas, or no-flying zones and should not exceed autonomy of the AV. Currently, the generation of a valid path is not only complex but also time-consuming and insufficiently automated.

Specifically, as to unmanned aerial vehicles (UAVs), the generation of a valid path is of great importance for emergency and risk management. Once launched, the UAV may need to re-define or re-plan the path. However, re-defining the path is normally carried out by an operator from a ground control station.

Consequently, it would be desirable that the ground control station or the AV itself implement the capability of autonomously changing the planned path for mechanical, environmental, or tactical reasons.

In particular, one of the exceptional measures in a contingency plan for an AV is the return-to-home (RTH) or return-to-landing (RTL) feature, which requires generating a path from the actual position. Current RTL solutions have several limitations.

For instance, some solutions use a straight path from its current position to home. To that aim, firstly, AVs achieve a safe altitude and then go back to base. However, the safe altitude approach has several shortcomings, such as no operational context or obstacles being taken into account. This may lead to flying over populated areas, restricted airspace, and/or other no-flying-zones (NFZs).

There are other proposals that make use of a pre-defined conflict-free RTH path at the time of modeling the mission. According to these approaches, RTL is defined regardless of where it is triggered. As a consequence, the AV might eventually run out of fuel or batteries when trying to land.

In general, existing proposals that enable a flexible RTH or RTL to bring the AV back to a safe point usually require high-computational resources.

Thus, existing solutions for planning or re-planning a path for an AV have setbacks and often cannot be applied in practice.

SUMMARY

The present disclosure provides flexible and pruning strategies to allow filtering out non-essential information usually provided in real-world operational environments, reducing the trial-and-error iterative process to prioritize a list of candidate waypoints to reach the target. As a result, computational requirements are less demanding and reliability is improved.

An aspect of the present disclosure relates to a method and a system capable of generating a pseudo-optimal path from a source to a destination, dealing with constraints like terrain obstacles and restricted areas that may exist in the way. Different altitude layers may be considered, including at least a layer containing the source and a layer containing the destination. To generate a two-dimensional (2D) horizontal scenario, an identification of constraints existing at each altitude layer should be carried out. If the same constraint exists for all the considered altitude layers, this means it is a common constraint and no vertical path can avoid it. Thus, a lateral path should be computed to find a possible solution that surrounds the constraint for this 2D horizontal scenario. Provided this lateral path is found, a vertical path is then computed for the corresponding 2D vertical scenario obtained from a projection of the computed 2D lateral path onto the constraints present at each altitude layer. Finally, the three-dimensional (3D) waypoints are composed based on the 2D lateral and vertical path.

The present disclosure aids in safely automating tasks for modelling missions and flight plans. It provides an autonomous way to obtain a customized 3D path between two locations taking into account operational context. It accommodates preferences and constraints to dynamically find a safe pseudo optimal path.

A particular aspect of the present disclosure is to implement an RTL feature that may be triggered if during a mission, as the AV is in flight, mechanical or environmental issues arise that require safely going to a pre-defined location (e.g., home base) from its current position and avoiding restricted zones and obstacles as well as reducing travel distance. In general, the generation of RTH or RTL paths currently requires the participation of the user, who models such paths.

BRIEF DESCRIPTION OF THE DRAWINGS

A series of drawings which aid in better understanding the disclosure and which are presented as non-limiting examples and are very briefly described below.

The figures are not to scale. In general, the same reference numbers will be used throughout the drawing(s) and accompanying written description to refer to the same or like parts.

DETAILED DESCRIPTION

Various embodiments illustrate a system and a method for generating a conflict-free safe 3D path from a source to a destination.

The generation of a 3D path is explained by way of example in this embodiment using an AV such as a UAV and the feature RTL from a source, namely the current position, to a destination, namely home. Home may be a base station or landing site. RTL is an important measure for handling unexpected events during flight. However, this explanation should not be regarded as restrictive, as other uses and functions can take advantage of these techniques since the generated 3D path avoids obstacles, terrain or restricted areas while user preferences are also taken into account.

For instance, the present teachings can be used, either onboard the UAV or on the ground, in mission planning tools, (e.g. in a mission planning system (MPS)) prior to a mission or during a mission between two locations, allowing different data to be used (e.g., maps, weather, fuel, performance, kinematic limitations, timing issues, etc.) to meet objectives.

Any region to avoid is indicated as a constraint. In the present detailed description, constraints will be modeled preferably as polygons, since polygonal modeling is computationally efficient. Alternatively, other geometrical shapes may be employed as representation of constraints.

The computation of an RTL path may be triggered by either the ground control station (GCS) operator manually or by some autonomous onboard contingency management system that detects a failure of onboard systems that require the RTL to be executed.

Figure 1:
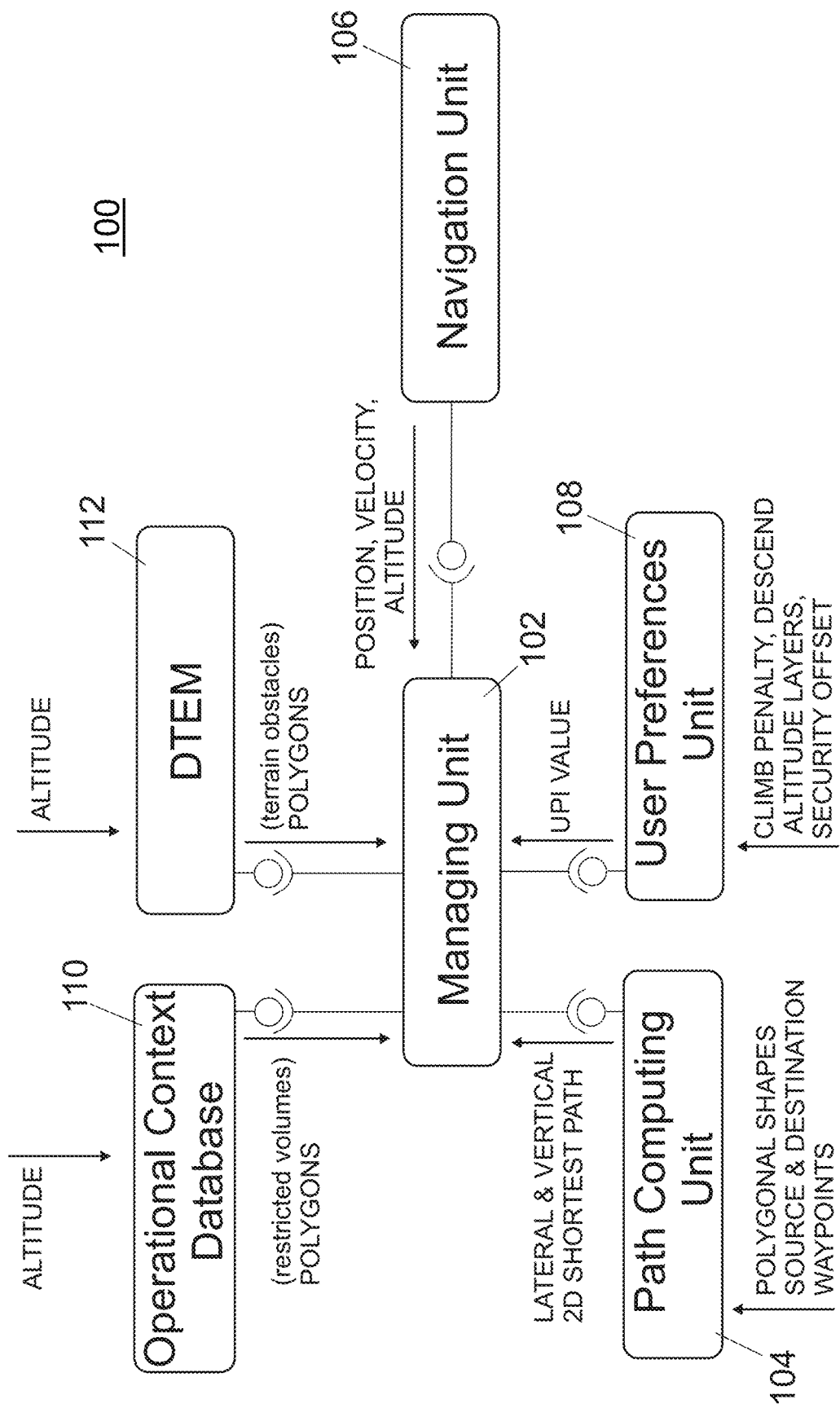
FIG. 1 is a high-level block diagram of a system for generating a 3D path.

FIG. 1 shows an example of a block diagram of a system 100 for generating a 3D path to a landing location. The infrastructure for 3D path generation includes several units:

A navigation unit 106, commonly present in AVs, provides the AV state vector (e.g., position, velocity, and attitude). The current position of the AV is used as a starting point to compute the RTL path. A user preferences unit 108 may store a landing location as a destination. The landing location may be the same home base where the AV took off, another base or a suitable landing place available nearby. Autonomy of the AV may be taken into account to select the landing location. Also, constraints of operational nature or terrain obstacles may be decisive to select a proper landing location for the AV.

With the current position and the landing location, several altitude layers can be established. A managing unit 102 can select a set of altitude layers. In the simplest case, there may not be an intermediate altitude layer. The number of altitude layers depends on the desired vertical resolution. This set of layers may be of different lengths and, firstly, contains the initial altitude layer, which corresponds to the current position of the AV and a final altitude layer, which corresponds to the landing location plus an intermediate altitude layer. Then, more altitude layers may need to be considered to find a proper RTL. Thus, the managing unit 102 can generate a 2D horizontal scenario by accessing and consulting an operational context database 110 and a digital terrain elevation model (DTEM) 112 of the vicinity. Constraints within a range at each selected altitude layer need to be properly identified to be avoided.

The operational context database 110 may contain constraints on the particular flight volumes within the range of the mission that shall not be violated. Such constraints may relate to: populated areas, airports/airfields, non-segregated airspace volumes, restricted airspace areas, etc. In particular, the operational context database 110 may provide a list of polygons that represent slices of such constraints at that particular altitude level.

DTEM 112 typically provides with terrain elevation data within the range of the AV flight or mission. For instance, NASA's Shuttle Radar Topography Mission (SRTM) provides nearly global coverage and appropriate accuracy for path generation purposes. The managing unit 102 may eventually request the DTEM 112 for information on the constraints (e.g. terrain obstacles) at a particular altitude. In some embodiments, the DTEM 112 may also generate a list of polygons that represent such constraints.

According to the constraints existing at each altitude layer, a 2D horizontal scenario is elaborated. Constraints may exist only at a particular altitude layer or may be common for all the altitude layers in the considered group of layers. In the latter case, those common constraints should be avoided by computing, if possible, a 2D lateral path that circumvents them (since no change among considered altitude layers can elude them). A path computing unit 104 deals with these tasks. Once a 2D lateral path is computed, an associated 2D vertical scenario can be generated by projecting the previously computed 2D lateral path onto the constraints existing at the altitude layers of the group. In this way, the path computing unit 104 can further compute a 2D vertical path avoiding constraints of this 2D vertical scenario.

Then, the path computing unit 104 is able to compose 3D waypoints according to the 2D lateral path and 2D vertical path. These 3D waypoints establish a possible 3D path to the landing location. The quality of the 3D path found may be evaluated. If the solution is regarded as inferior, an additional altitude layer may be included in the group. The new set is likewise processed and a different 3D path to the landing location may exist of superior quality.

Quality of 3D path solutions may be established by defining and evaluating a metric. The metric may be based on distance and altitude difference between consecutive 3D waypoints. In some particular embodiments, the user preferences unit 108 can implement a metric taking into account different parameters and their weights according to their importance. The user preferences unit 108 may compute a metric called "User Preference Index" (UPI), which is a function that represents how convenient is the computed 3D path according to certain preferences (e.g., mission objectives).

The following parameters may be considered in a particular embodiment:

List of altitude layers to find the RTH path: No path is going to be evaluated above the maximum or below the minimum altitudes within this list.

Climb penalty factor: Climb paths have a cost in terms of energy consumption (fuel or battery). This factor is applied to the path segment where the climb takes place in order to compute the UPI.

Descend gain factor: A parameter that works in the opposite way as the climb penalty factor, as descents involve energy savings.

Offset safety buffer: A parameter that represents the distance at which all polygons that represent boundaries of constraints are to be offset so that the resulting 3D RTL path features a safety buffer that copes for things like turn radius or climb path angles. It may be defined with different values for each altitude layer. Alternatively, constraints obtained from operational context database 110 and DTEM 112 may include an associated offset.

The above parameters are not exhaustive; others may be considered as well, such as estimated flight time to each waypoint. An example of UPI is given by the following expression:

$$UPI = \frac{\sum_{i=1}^{n}(l_i + \Delta h_i \cdot f)}{L}$$

Where the 3D path under consideration has n 3D waypoints, and for each pair of waypoints:

$l_i$ is the distance between waypoint i and waypoint i−1;

$\Delta h_i = (h_i - h_{i-1})$, and is the altitude difference between waypoint i and waypoint i−1;

f is the gain/penalty factor applied, which is the climb penalty factor incase $\Delta h_i$ is positive (climbs), and the descend gain factor otherwise;

L is the straight distance between the source waypoint (i=0) and the destination waypoint (i=n).

The main task of the path computing unit 104 is to compute a 2D path between a source and destination at a given altitude that avoids constraints (represented in figures by polygons). The purpose of the path computing unit 104 is two-fold:

On one side, once a particular 2D scenario is prepared, the shortest 2D path between the source point (AV position) and the destination point (home). This is performed in 2D. The input in this case is normally a sequence of polygonal shapes that represent a considered 2D horizontal scenario that may represent the combination of several altitude levels. The output is a sequence of 2D points that represent the aforementioned 2D shortest path.

On the other side, another function is to find the shortest vertical path once the vertical section of a particular scenario is defined. The information coming out of this operation is combined with the 2D path to produce a sequence of 3D waypoints that make up the final solution.

The path computing unit 104 may implement techniques disclosed in the European patent application EP15382365 titled "Method and System for Autonomous Generation of Shortest Lateral Paths for Unmanned Aerial Systems", which solves this problem. Some of these techniques will be explained later.

While an example manner of implementing the system 100 for generating a 3D path to a landing location is illustrated in FIG. 1, one or more of the elements, processes, and/or devices illustrated in FIG. 1 may be combined, divided, re-arranged, omitted, eliminated, and/or implemented in any other way. Further, the managing unit 102, the path computing unit 104, the navigation unit 106, the user preferences unit 108, the operational context database 110, and the DTEM 112, and/or, more generally, the system 100 of FIG. 1 may be implemented by hardware, software, firmware, and/or any combination of hardware, software, and/or firmware. Thus, for example, any of the managing unit 102, the path computing unit 104, the navigation unit 106, the user preferences unit 108, the operational context database 110, and the DTEM 112, and/or, more generally, the system 100 of FIG. 1 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)). When reading any of the apparatus or system claims of this patent to cover a purely software and/or firmware implementation, at least one of the managing unit 102, the path computing unit 104, the navigation unit 106, the user preferences unit 108, the operational context database 110, and/or the DTEM 112 is/are hereby expressly defined to include a non-transitory computer readable storage device or storage disk such as a memory, a digital versatile disk (DVD), a compact disk (CD), a Blu-ray disk, etc., including the software and/or firmware. Further still, the system 100 of FIG. 1 may include one or more elements, processes, and/or devices in addition to, or instead of, those illustrated in FIG. 1, and/or may include more than one of any or all of the illustrated elements, processes, and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 2:
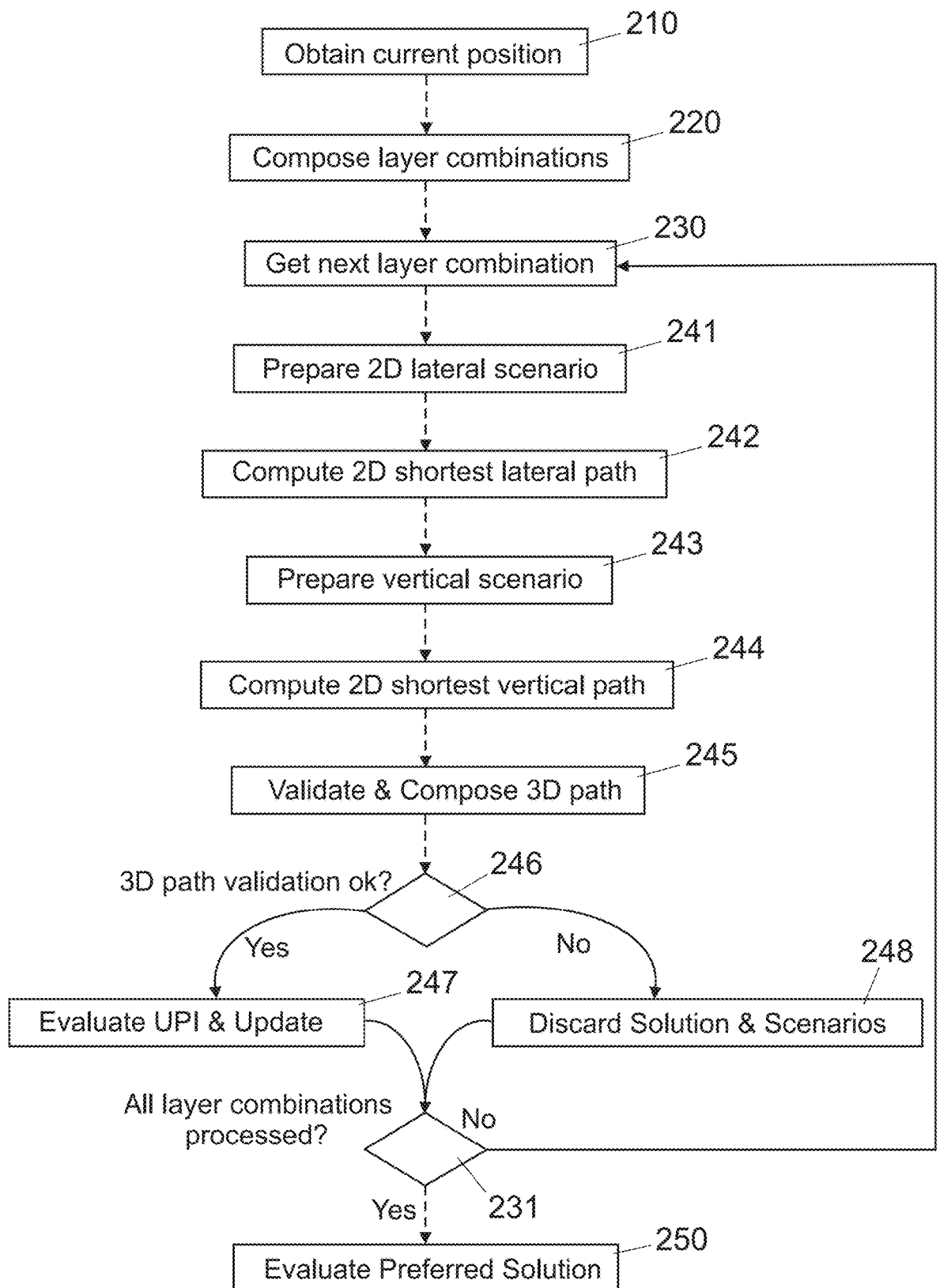
FIG. 2 illustrates general steps for a 3D RTL path generation.

A flowchart representative of example hardware logic, machine readable instructions, hardware implemented state machines, and/or any combination thereof for implementing the system 100 of FIG. 1 is shown in FIG. 2. The machine readable instructions may be an executable program or portion of an executable program for execution by a computer processor such as the processor 1812 shown in the example processor platform 1800 discussed below in connection with FIG. 18. The program may be embodied in software stored on a non-transitory computer readable storage medium such as a CD-ROM, a floppy disk, a hard drive, a DVD, a Blu-ray disk, or a memory associated with the processor 1812, but the entire program and/or parts thereof could alternatively be executed by a device other than the processor 1812 and/or embodied in firmware or dedicated hardware. Further, although the example program is described with reference to the flowchart illustrated in FIG. 2, many other methods of implementing the system 100 of FIG. 1 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example processes of FIG. 2 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory, and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

FIG. 2 represents a flowchart diagram with sequential steps for the 3D RTL path generation.

Firstly, in step 210, current AV position is obtained. The managing unit 102 may request the navigation unit 106 for the current AV state vector from which the position is to be used as the source waypoint throughout the RTL 3D path generation process.

In step 220, layer combinations are composed. The approach for obtaining the 3D path is discrete in the vertical profile, in the sense that only a set of altitude layers is considered. In order to search for potential 3D paths, such altitude layers have to be combined in a particular manner Given a lower and upper altitude limit, a search for the optimal RTL 3D path is performed considering climb segments up to the upper altitude and descent segments down to the lower altitude.

All altitude layers between the upper and lower limits are combined. Upper and lower levels do not have to be necessarily the highest and lowest altitude layers defined in the user preferences unit 108. It is desirable to analyze different scenarios so that different vertical ranges are used in the computation of 3D paths.

At any event, all altitude layers between the altitude of the AV and that of the landing location have to be considered.

In sum, the baseline of this approach is to gradually increase layers in a one per one basis to generate different scenarios where a 3D RTH path can be obtained.

Figure 3:
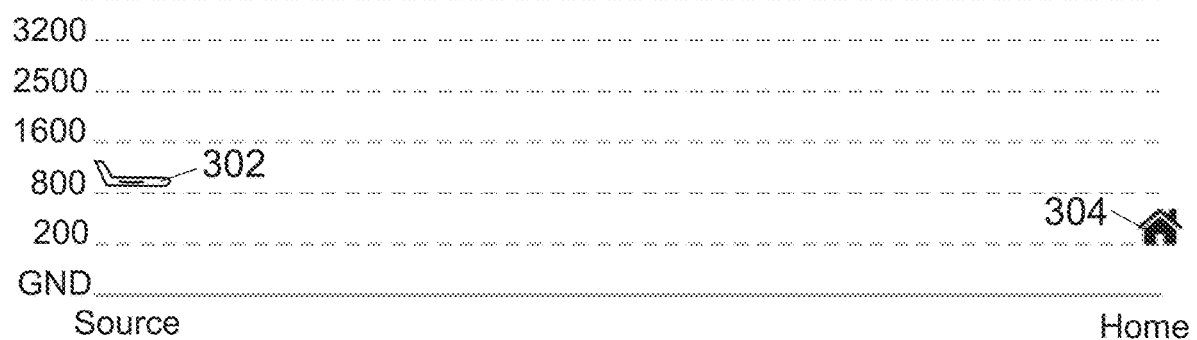
FIG. 3 illustrates an example of altitude layers to be considered in a vertical scenario.

FIG. 3 serves as an example of the above teachings. The user defines several altitude layers, namely: 200 m, 800 m, 1600 m, 2500 m and 3200 m. In addition, the AV 302 (e.g., the UAV 302, which includes the system 100 of FIG. 1) is currently flying at a source at 800 m whereas the landing location 304 is at 200 m. The following combinations will be the result of the step 220.

Group of layers 200, 800—As the AV 302 is at layer 800 m and the landing location 304 is at layer 200 m, this is the simplest scenario in which an RTL 3D path can be computed. Evidently, that 3D path allows vertical motion of the AV 302 between layers 200 and 800.

Group of layers 200, 800, 1600—As aforementioned, the baseline of the approach is to gradually increase layers in a one per one basis. In this scenario, a 3D RTL path will be computed that allows altitude levels between 200 and 1600 m.

Group of layers 200, 800, 1600, 2500 and group of layers 200, 800, 1600, 2500, 3200 are the remaining combinations that are to be considered.

In step 230, a next layer combination is considered. As previously mentioned, initially the scenario that includes all altitude layers between the UAV and the landing location is considered. Later a new scenario that results from including an additional layer is to be considered.

In step 241, 2D lateral scenario is prepared. According to the present approach, first, a shortest lateral path solution is computed, and later, vertical path information is added up. The actions encompassed in the step 241 are:

For each considered altitude layer, the managing unit 102 requests the operational context database 110 for the polygons that represent airspace restrictions, or No-Fly-Zones in general (e.g., populated areas, non-segregated airspace, etc.); and the DTEM 112 for the polygons that represent obstacles (e.g., airspace restrictions, No-Fly-Zones, terrain obstacles, etc.).

For each considered altitude layer, the managing unit 102 requests the DTEM 112 for terrain contour lines, where such contour lines are also represented by polygons in this embodiment.

For each of the obtained polygons, an offset may be applied. The purpose of such offset is to provide a safety buffer in the resulting 3D RTL path with respect to the constraints to cope for factors like turn radius. Such offset may be defined in the User Preferences unit 108.

In a 2D approach, the intersections among all provided polygons is computed. This may result in a new set of polygons (or no polygons at all) that represent the constraints that have to be avoided necessarily in the lateral path. This set of polygons is the output of this step.

In step 242, 2D shortest lateral path is computed. The step 242 finds the shortest path between the source and destination waypoints (e.g., the UAV 302 and the landing location 304 of FIG. 3), avoiding the polygons that have been defined previously.

The managing unit 102 provides the path computing unit 104 with scenario information (e.g., source, destination, and polygons) so the latter provides the solution as a sequence of 2D waypoints. Likewise, as previously mentioned, the path computing unit 104 may use the techniques detailed in European patent application EP15382365 to obtain the 2D shortest path.

In step 243, a vertical scenario is prepared. At this point, a lateral path is already computed. Said lateral path is the shortest that avoids common constraints, that is to say those constraints that are present in the set of altitude layers considered for that scenario (combination of layers). Yet, changes in altitude have to be computed in order to avoid constraints that are not common to all altitude layers (i.e. to avoid polygons at each level).

Figure 6:
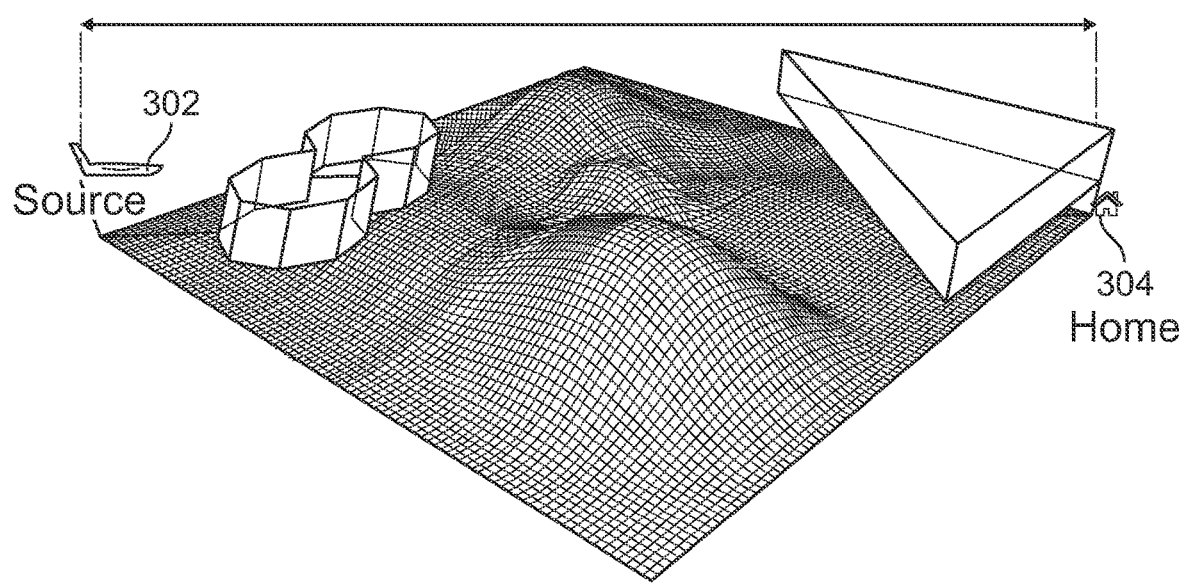
FIG. 6 illustrates an overall scenario in 3D with constraints.

The vertical scenario represents the vertical section of all considered layers along the 2D computed path. In order to define such vertical scenario points of intersection of the 2D path with polygons from all layers have to be computed. Further details on how this may be carried out are explained later when FIG. 6 is discussed.

The result of the step 243 is a vertical section along the intended trajectory of the UAV, in which simple polygons represent the constraints that have to be avoided by changes in altitude.

Figure 4:
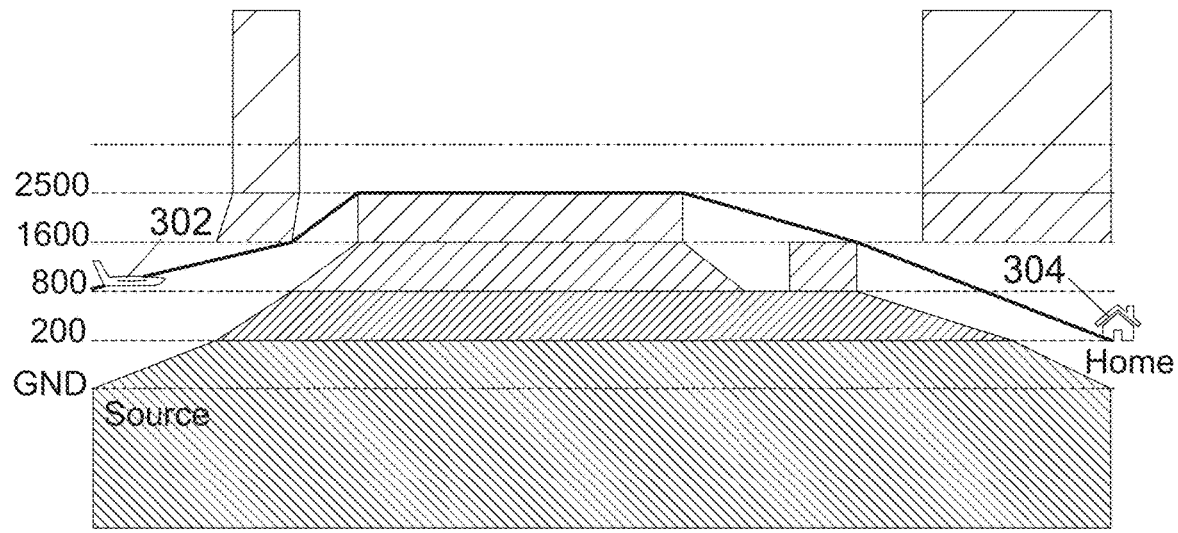
FIG. 4 illustrates a preparation of a vertical scenario by extending polygons.

FIG. 4 illustrates that polygons in upper and lower altitude layers are extended towards levels outside of the group of layer combination considered in the scenario in order to facilitate the work of the following step 244.

In step 244, the 2D shortest vertical path is computed. This step 244 is similar to step 242 since a 2D shortest lateral path is computed but now applied to the vertical section.

The path computed in this step 244 represents changes in altitude along the already computed 2D shortest path. The obtained vertical path avoids the polygons that have been defined in the previous step 243 for preparation of vertical scenario.

The managing unit 102 provides the path computation unit 104 with the scenario information (e.g., source and destination waypoints, and polygons that represent vertical obstacles) and the latter provides the solution as a sequence of distance with associated altitude.

In step 245, a 3D path is composed. If the previous step 244 succeeds to provide a proper solution, then the RTL 3D path is composed as a sequence of 2D waypoint and altitude pairs.

In step 246, validity of the composed 3D path is checked. If positive, then in step 247—UPI function is calculated. In this step 246, the computation of the UPI associated with the 3D path composed in the step 245 takes place. Once the UPI is obtained, the 3D path together with its UPI are appended to a catalog of RTL solutions.

If there are still scenarios (e.g. combinations of layers) to be processed, the algorithm goes back to step 230 to get next layer, otherwise the remaining step is for selecting the most suitable solution out of the RTL paths computed, which is carried out in step 250 of evaluation of preferred solution.

Figure 5:
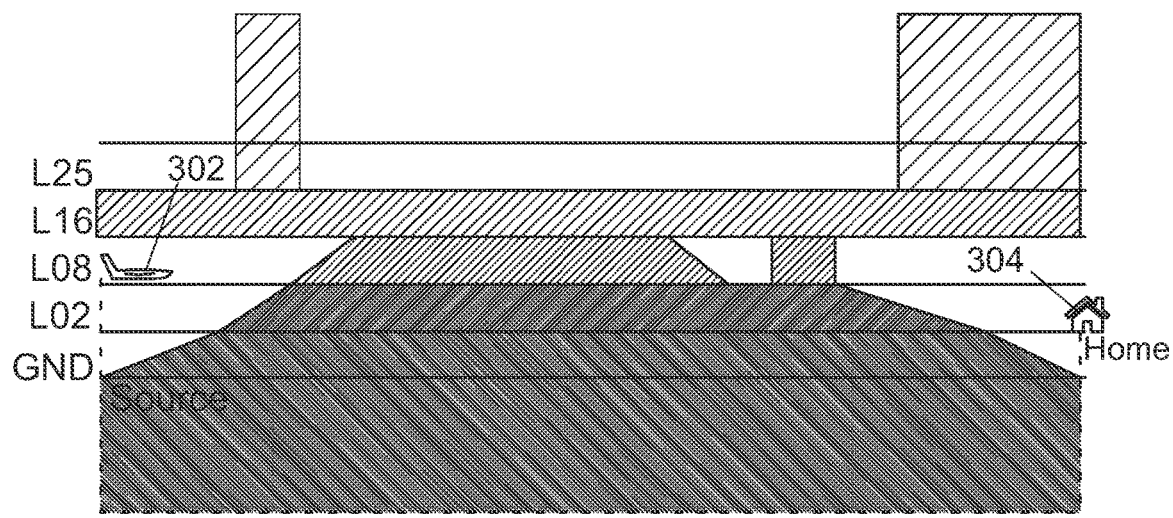
FIG. 5 illustrates such an example with a non-valid solution for a vertical scenario.

In step 248, the solution is discarded. There are particular cases in which the computation of the 2D shortest vertical path fails to provide a valid solution (for instance when one of the inner layers contains an obstacle big enough). In such cases, a solution would imply going beyond the group of altitude layers, therefore the solution is invalid and discarded. FIG. 5 shows such an example of an invalid solution (shown in dotted lines) since features with negative altitudes are below the ground level.

If there are still layers to be processed, step 230 is performed to get next layer. Otherwise, the remaining step is to select the most suitable solution out of the RTL paths computed, which is carried out in step 250.

In step 250, the preferred solution is evaluated. For example, once all the layer combinations to form groups identified in step 220 have been processed and resulting 3D RTL paths and associated UPI have been stored in a catalog of RTL solutions, the preferred solution is determined. The final 3D RTL path to be considered as the best option according to the user preferences is the one that features the lowest UPI index.

Different situations will be explained in more detail by way of an additional example with reference to FIG. 6 to FIG. 17. Characteristics and parameters used in this example are the following:

- The distance between the AV (e.g., the UAV) and the destination (home) at the time of triggering the RTL is 50 kilometers (km)
- The AV altitude is 800 meters above ground level (AGL).
- The Home location is 200 meters AGL.
- There are several mountains in the straight way home.
- There are two different regions of airspace that forbid AV operations at altitudes equal or higher than 1600 m.
- For simplification purposes, no fixed No-Fly-Zones have been considered, these would be treated just like an airspace region which forbids UAV operation from the ground up.
- Four different altitude layers have been considered: 200 m, 800 m, 1600 m and 2500 m. Naturally, in a real scenario further layers would provide better resolution in the vertical profile.
- Value for climb penalty is considered to be 10. This means that a climb of X meters is considered as if a lateral distance of 10× is added to the trajectory.
- No user preference Offset has been defined for simplicity purposes. Annex C applies an offset to the scenario that covers 200 m to 2500 m altitude layers.
- Value for descend bonus is considered to be 5. This means that a descent of X meters is considered as if a segment of 5× length is taken out of the overall trajectory.

Selection of a Group of Altitude Layers

Figure 7:
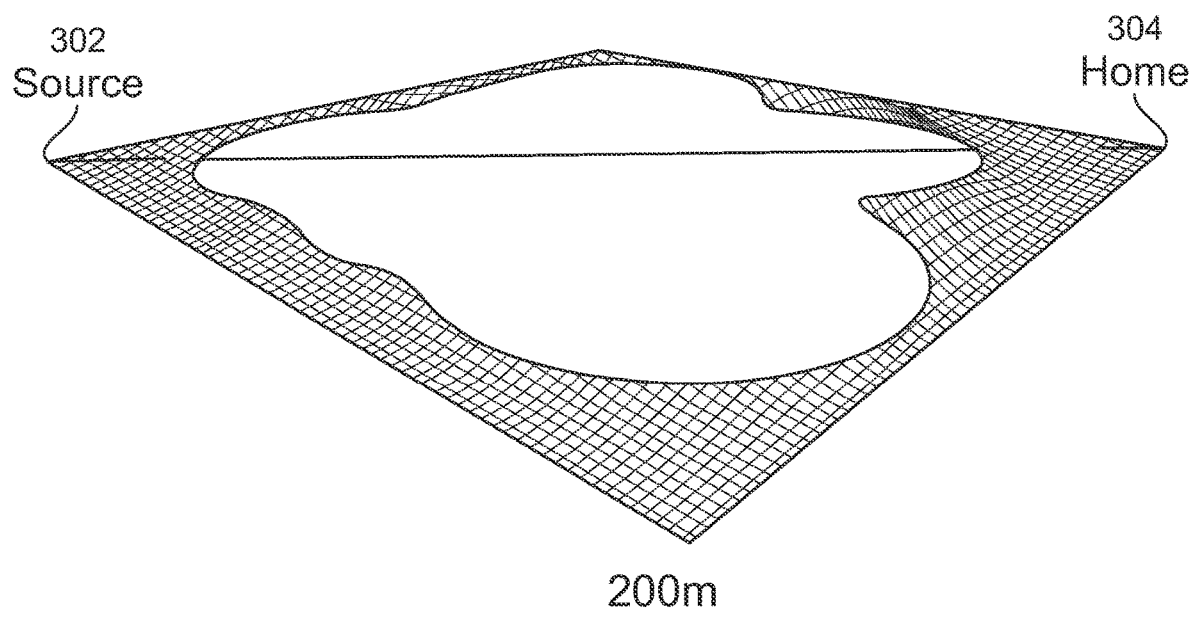
FIG. 7 illustrates a horizontal section cut through of FIG. 6 at a first altitude level.
Figure 8:
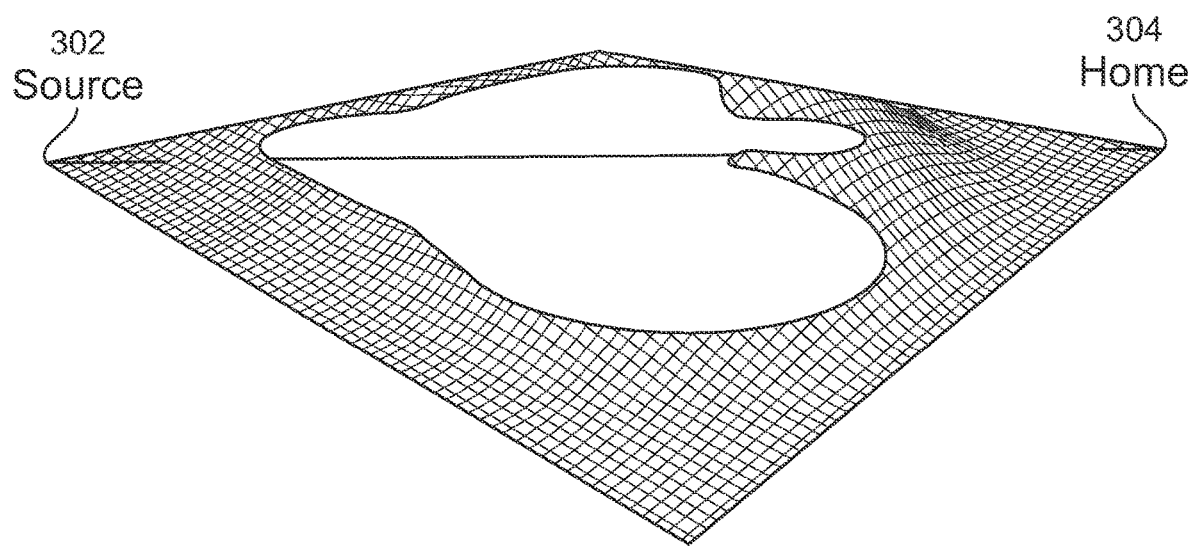
FIG. 8 illustrates a horizontal section cut through of FIG. 6 at a second altitude level.
Figure 9:
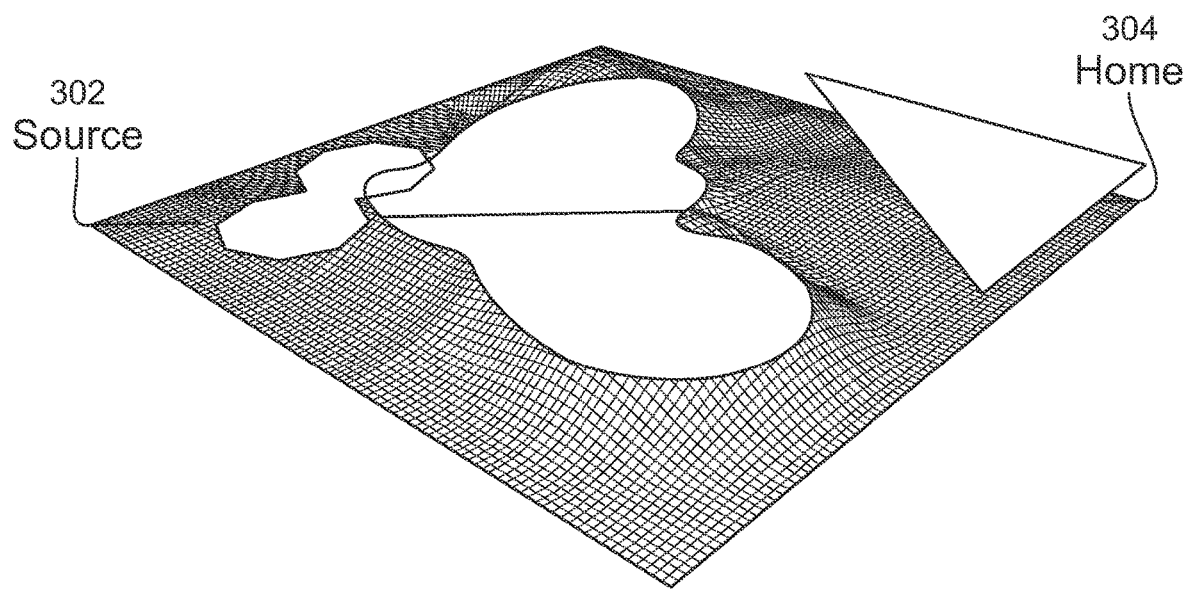
FIG. 9 illustrates a horizontal section cut through of FIG. 6 at a third altitude level.
Figure 10:
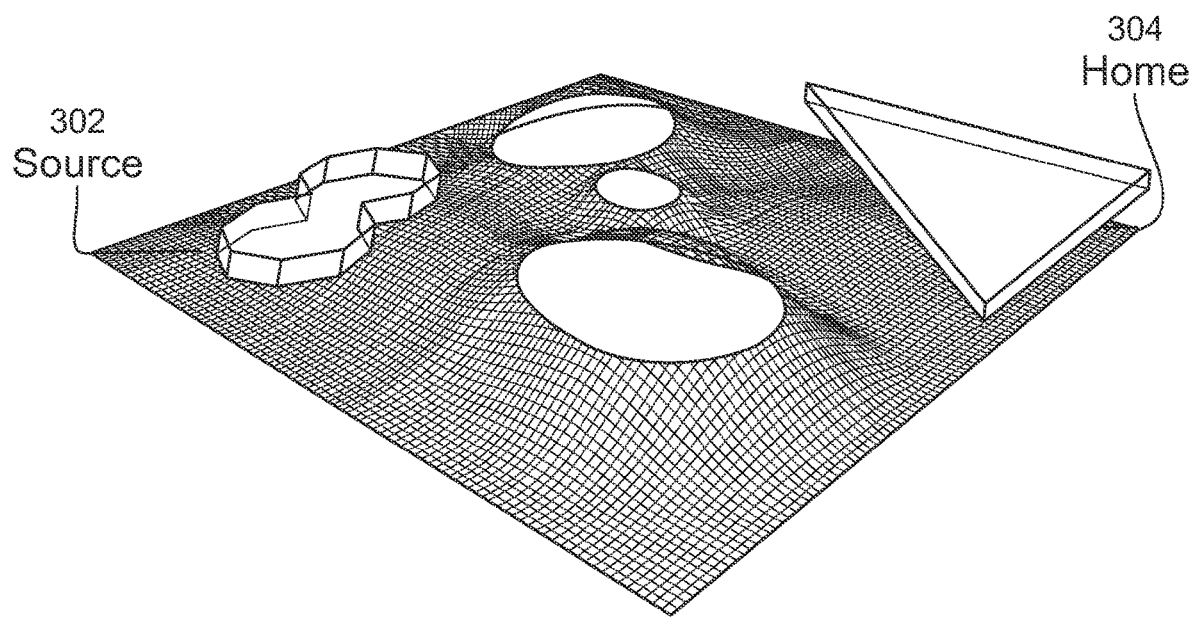
FIG. 10 illustrates a horizontal section cut through of FIG. 6 at a fourth altitude level.

FIG. 6 illustrates the overall scenario in 3D, while FIG. 7 to FIG. 10 represent resulting sections at different altitudes layers: FIG. 7 corresponds to a first section with layer 200 m, FIG. 8 corresponds to a second section with layer 800 m, FIG. 9 corresponds to a third section with layer 1600 m and FIG. 10 corresponds to a fourth section with layer 2500 m.

Figure 11:
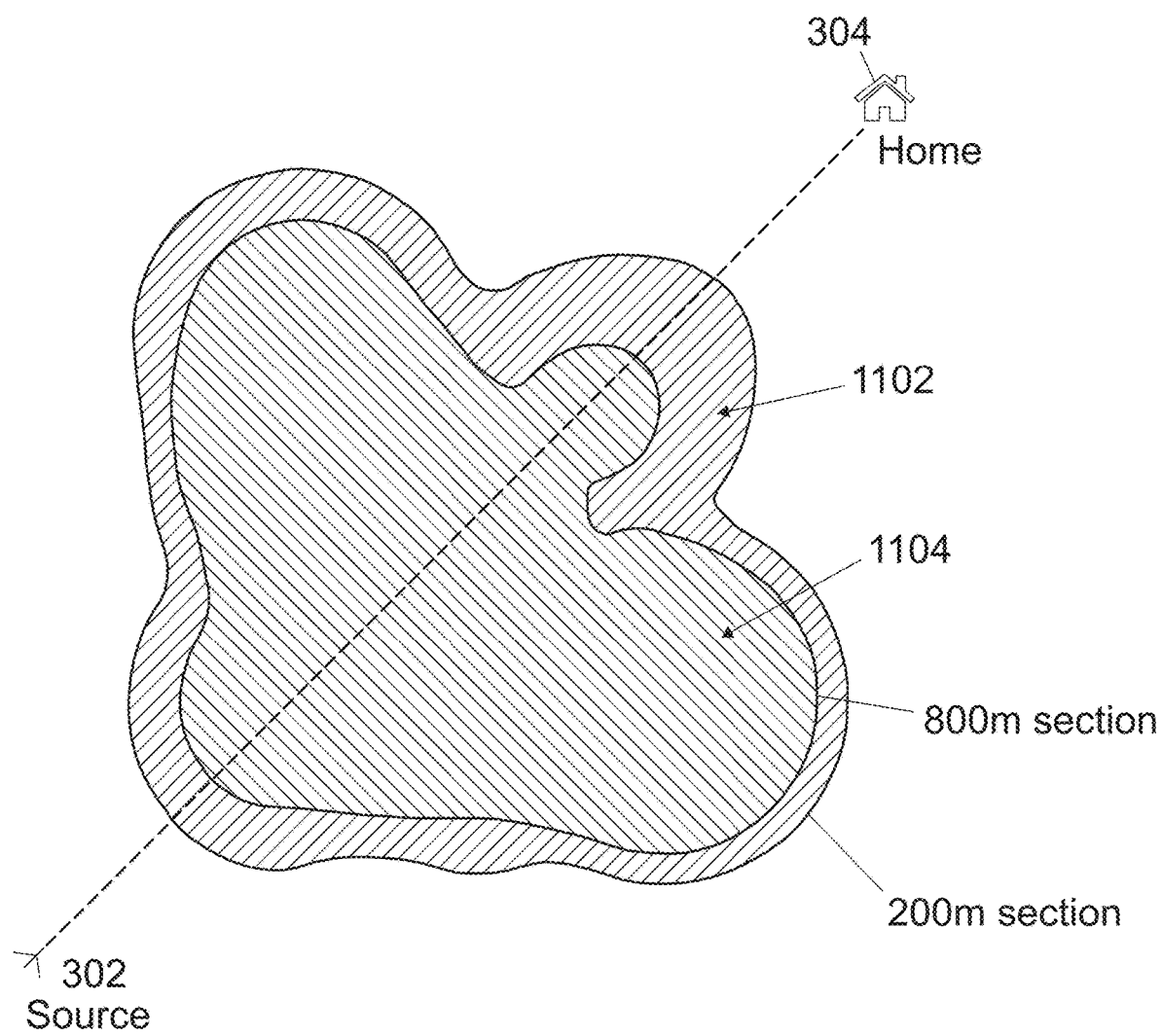
FIG. 11 illustrates a first group of altitude layers in a horizontal scenario.
Figure 12A:
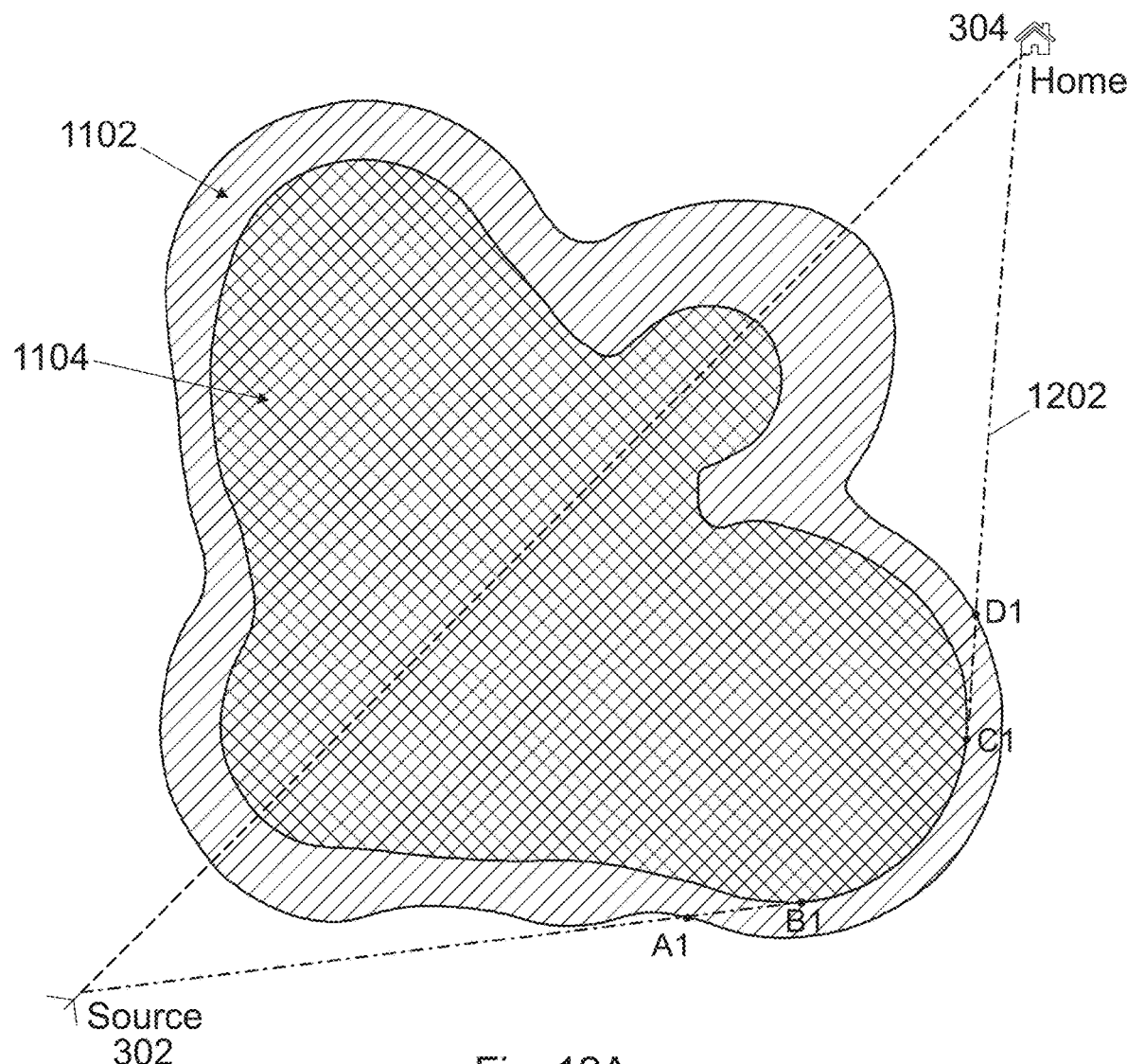
FIG. 12A illustrates a horizontal scenario and a lateral path obtained for the first group.
Figure 12B:
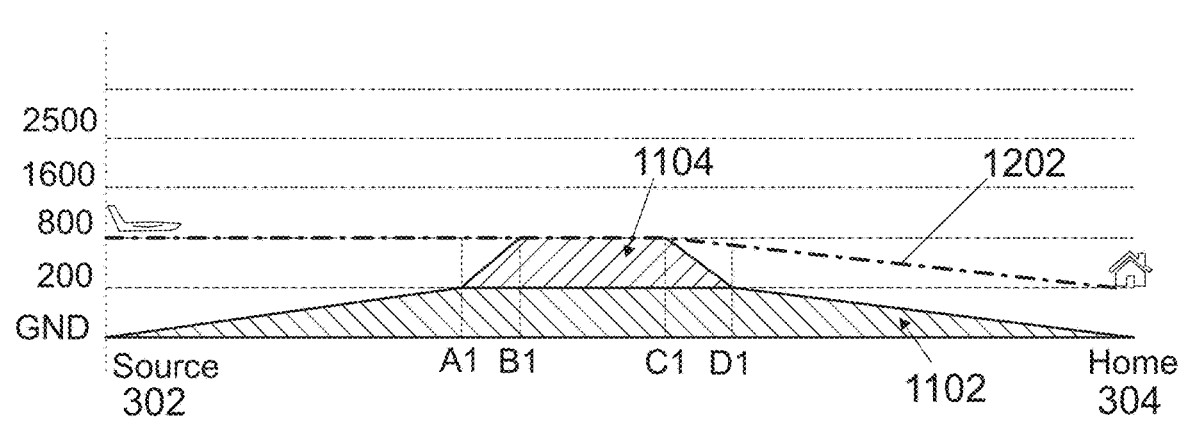
FIG. 12B illustrates a vertical scenario and a vertical path obtained for the first group.

Groups of different altitude layers are to be selected in order to generate one or more valid 3D RTL paths. As mentioned previously for simplicity a maximum of four layers are considered: 200 m, 800 m, 1600 m, and 2500 m. At least the initial altitude layer 800 m and final altitude layer 200 m have to be combined as the UAV is flying from the source 302 of FIG. 3 at 800 m to the destination 304 of FIG. 3 at 200 m. Thus, as a baseline scenario, all altitude layers between the source 302 and destination 304 need to be considered, which leads to the following groups:

A first group having altitude layers 200 m and 800 m with reference to FIG. 11 and FIGS. 12A and 12B.

Figure 13:
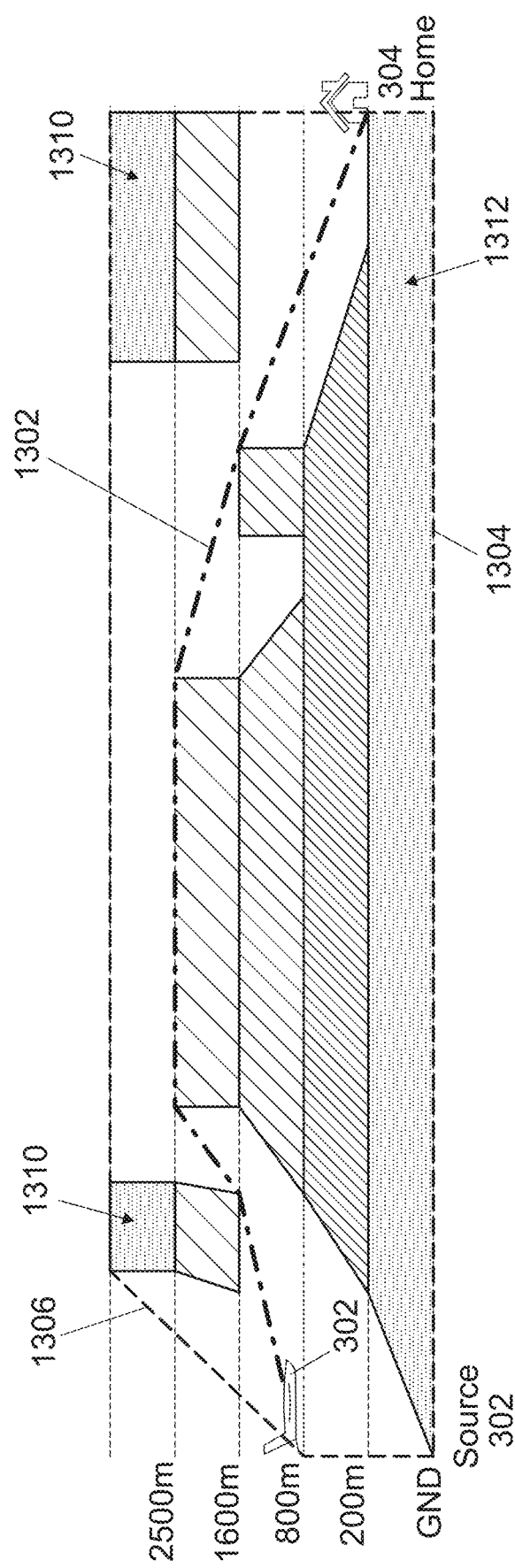
FIG. 13 illustrates a vertical scenario for a second group and potential paths.

A second group having altitude layers 200 m, 800 m, and 1600 m, with reference to FIG. 13.

Figure 14:
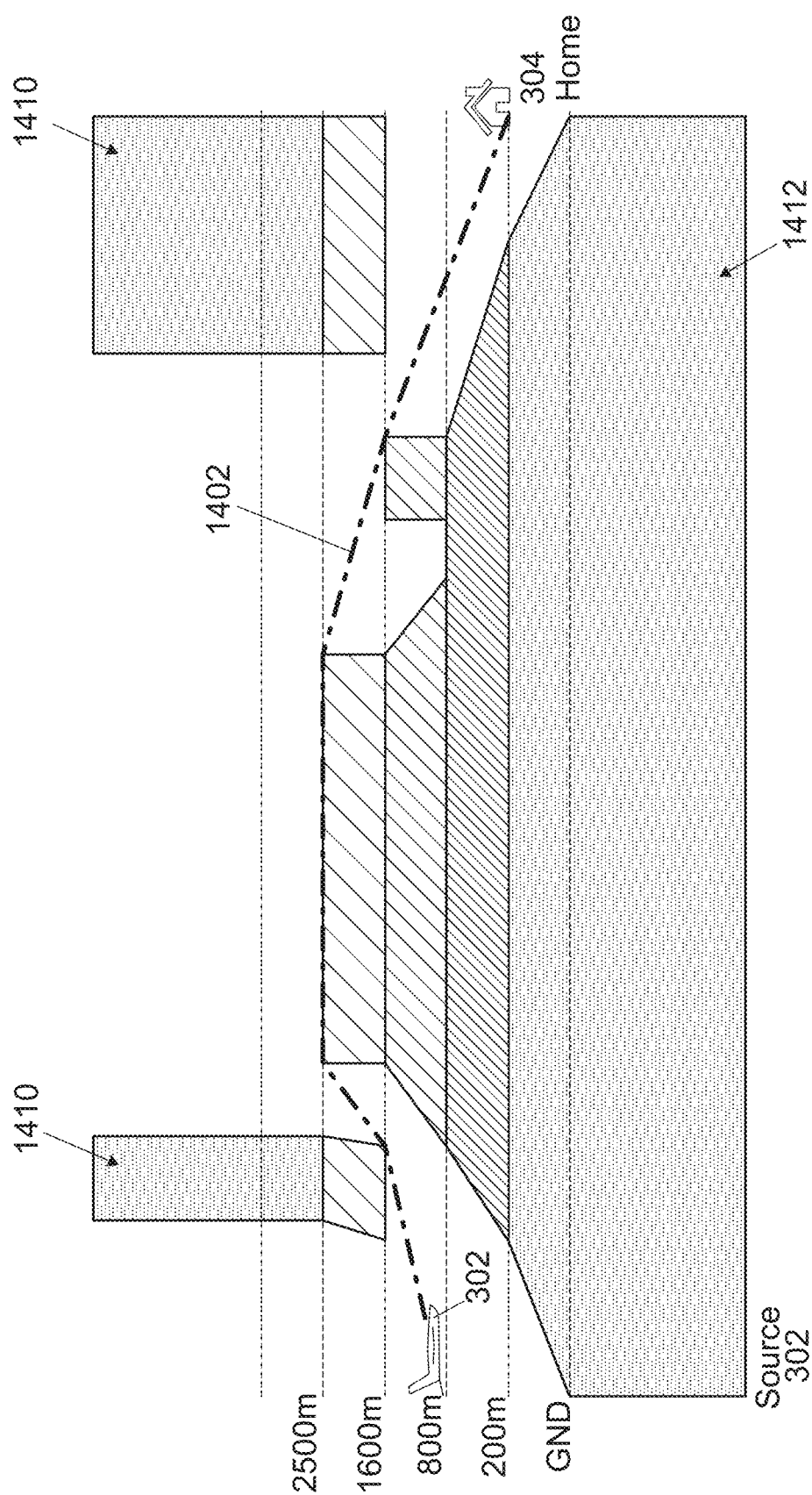
FIG. 14 illustrates a vertical scenario for a second group and a valid vertical path.

A third group having altitude layers 200 m, 800 m, 1600 m, and 2500 m, with reference to FIG. 14.

Preparation of Horizontal Scenario for the First Group of Layers

FIG. 11 illustrates a horizontal scenario with two constraints areas 1102 and 1104 corresponding to altitude layers 200 m and 800 m, respectively. The UAV 302 can move between these altitude layers. Once the group of altitude layers is selected, in this case, layers 200 m and 800 m, then:

i) The managing unit 102 requests the operational context database 110 for polygons that are either at 200 m or 800 m. As there are no operational context constraints at such altitude level, the result is that no polygons are returned.

ii) The managing unit 102 requests the DTEM 112 for terrain contour lines at 200 m and 800 m. As depicted in FIG. 11, the constraint area 1102 corresponds to the 200 m section while the constraint area 1104 corresponds to the 800 m section.

iii) The horizontal scenario finalizes by intersecting all obtained polygons, which provides common constraints that cannot be avoided by a change in altitude and thus have to be avoided by changes in the lateral path (if possible).

FIG. 12A illustrates the horizontal scenario of FIG. 11 and a 2D lateral path 1202 in dot-lash line from source 302 to destination 304 of FIG. 3 resulting from avoiding the common constraint area 1104 of FIG. 11, which is present at each altitude layer in the group. In this scenario, the intersection coincides with the 800 m contour line enclosing area 1104 of FIG. 11, which is also depicted by constraint area 1104 with a squared pattern in FIG. 12A. In contrast, constraint 1102 can be eluded by a vertical move of the AV 302 to fly at an altitude of 800 m.

Preparation of Vertical Scenario for the First Group of Layers

In FIG. 12B, the vertical scenario corresponding to FIG. 12A is illustrated. By applying a change in altitude of the UAV 302, namely climb sub-path from A1 to B1, the constraint 1102 is avoided. As a result, a corresponding valid 2D vertical path 1202 in dot-lash line from source 302 to destination 304 is obtained. Once the vertical scenario is prepared, the shortest 2D path from source 302 to home 304 is computed. As mentioned, a way of computing this 2D path is applying the teachings of the 2D shortest path disclosed in European patent application No. 15382365.

Composition of 3D Waypoints for the First Group of Layers

After computing 2D lateral and vertical paths, 3D waypoints can be obtained. At this point, a validation of the climb/descend segments may be performed to ensure that the UAV 302 is capable (e.g. no kinematic limitation) of conducting such maneuvers without intersecting constraints. In the scenario corresponding to the first group, the resulting 3D path is given by the sequence: (S, 800), (B1,800), (C1,800), (D1,800), (H, 200).

Having the 3D path computed, in order to compare how good the solution is as compared to other solutions, the previously introduced metric, UPI, can be evaluated:

$$UPI = \frac{\sum_{i=1}^{n}(l_i + \Delta h_i \cdot f)}{l_n} = 1.2006$$

The table below shows more details:

| Point from | Point to | length [m] | delta altitude [m] | $(l_i + \Delta h_i \cdot f)$ |
|---|---|---|---|---|
| S | B1 | 26847 | 0 | 26847 |
| B1 | C1 | 10296 | 0 | 11161 |
| C1 | D1 | 4400 | 0 | 3810 |
| D1 | H | 21212 | −600 | 18212 |

The resulting value of UPI is 1.2 for this scenario. A value of 1 would be given by a constant altitude straight RTL path from S to H.

The next group of layers to search for RTL path is made up by layers at altitudes 200 m, 800 m, and 1600 m and the preparation of the corresponding vertical and horizontal scenario is similar.

A solution may be geometrically valid but not operationally as they violate both upper or lower altitude levels. A simple way to avoid this while facilitating computations is to prolong upper and lower level polygons as illustrated in FIG. 13, which corresponds to the vertical scenario between 200 m and 1600 m of altitude. As can be seen, existing constraints are extended down to ground and up to next upper layer. This is depicted in dotted blocks 1310 and 1312. Thus, invalid solutions like those represented in long dashed line paths 1304 and 1306 would not be considered.

Similarly, FIG. 14 shows a scenario for the second group including previous altitude layers 200 m, 800 m, and additionally layer 1600 m. Existing constraints are additionally extended down to lower limit as can be seen in dotted block 1412 and up to upper limit as in block 1410, to avoid computing any valid geometric solutions that are not valid operation-wise.

Preparation of Horizontal Scenario for the Second Group of Layers

Figure 15:
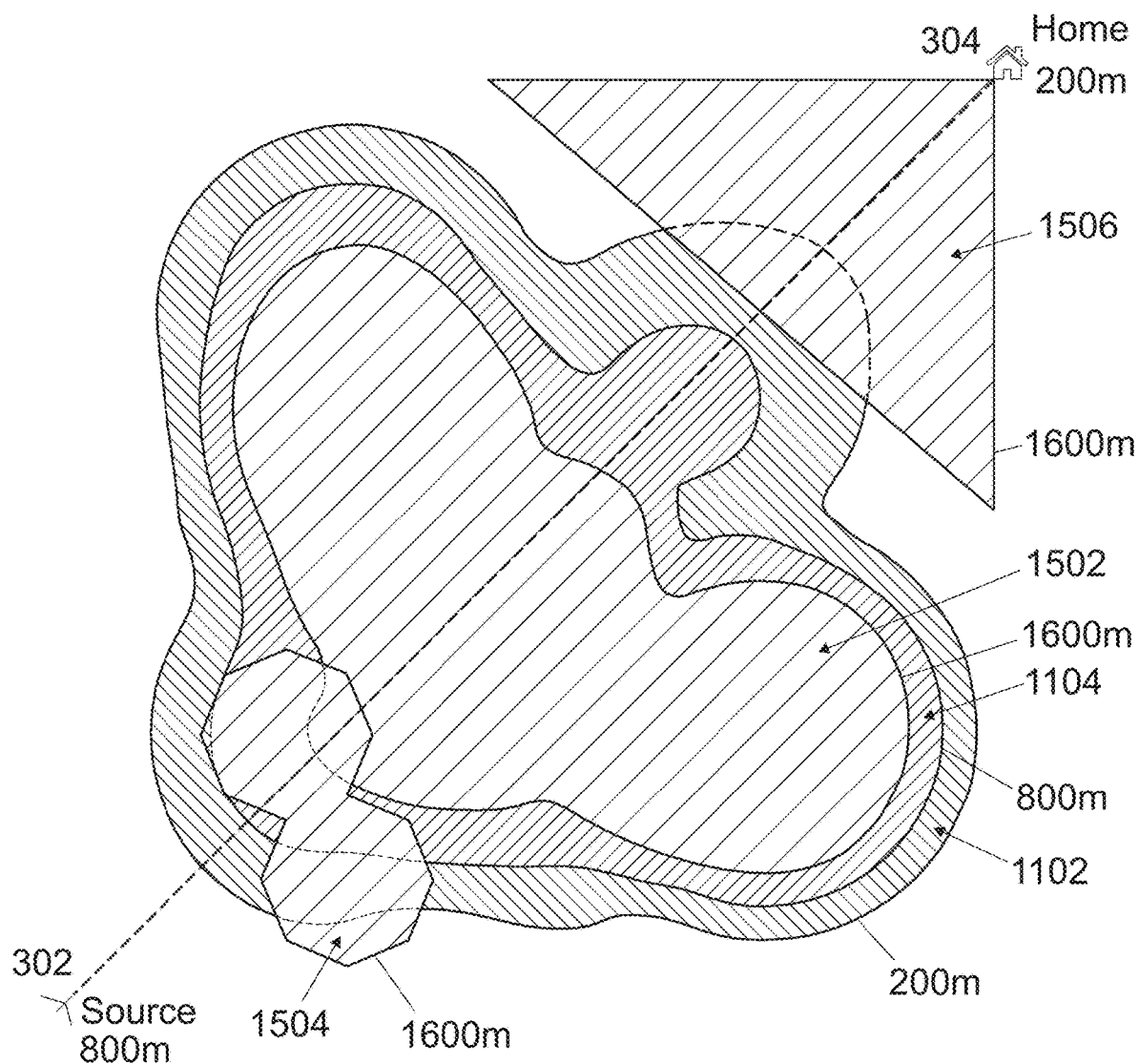
FIG. 15 illustrates a horizontal scenario for the second group of altitude layers.
Figure 16A:
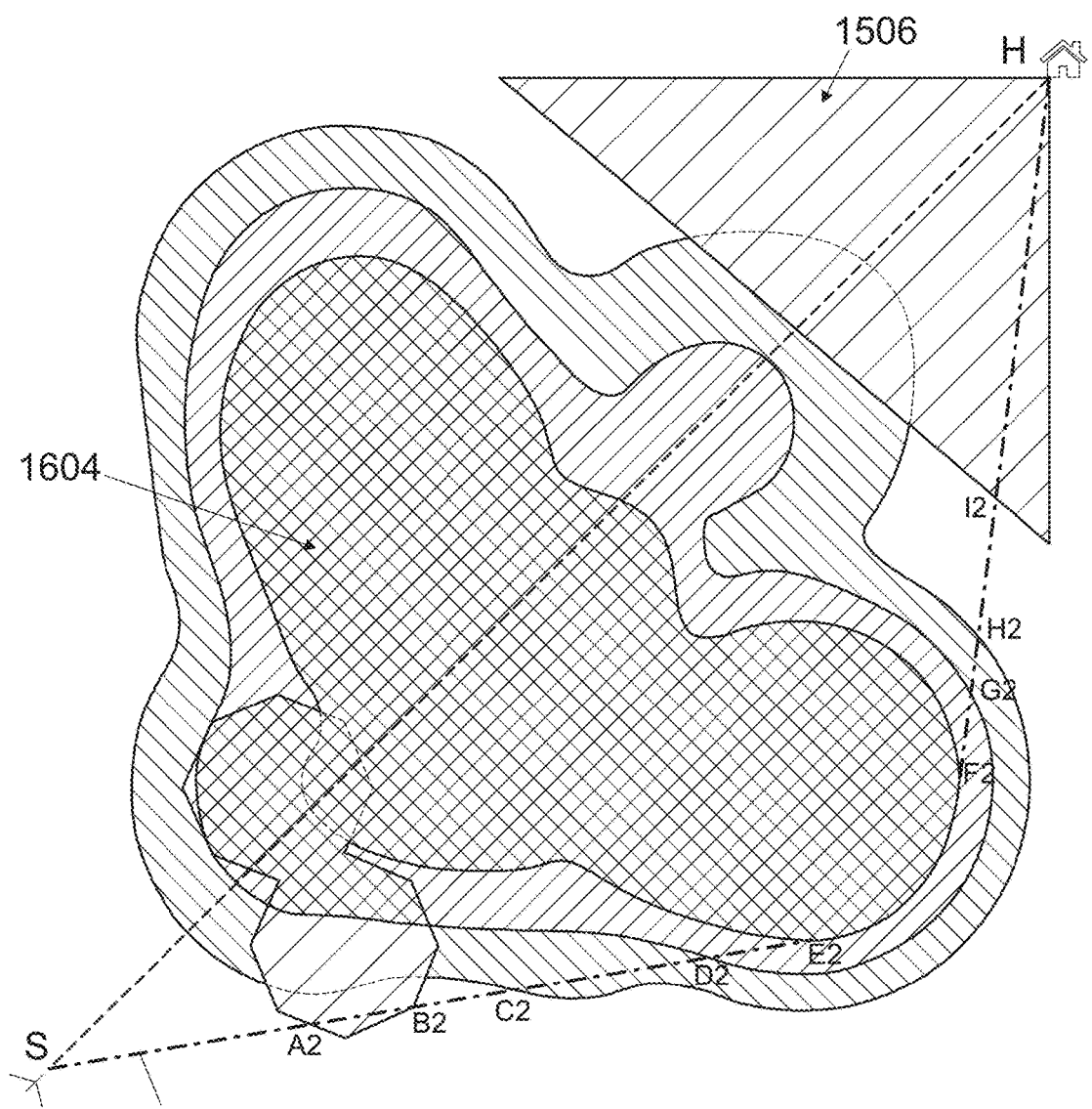
FIG. 16A illustrates a horizontal scenario and a valid lateral path for the second group.

FIG. 15 shows different constraints represented as polygons to take into account between altitude layers 200 m and 1600 m. Shape 1102 represents 200 m sections, shape 1104 represents 800 m sections, and shapes 1502, 1506, and 1502 represent 1600 m sections. FIG. 16A shows the processed horizontal scenario of FIG. 15, where shape 1604 in square lines pattern represents the intersection among all common constraints present at all the altitude layers of the second group. The 2D shortest lateral path results in the dash-dot line 1602 that covers the segments S-A2-B2-C2-D2-E2-F2-G2-H2-I2-H.

Preparation of Vertical Scenario for the Second Group of Layers

Figure 16B:
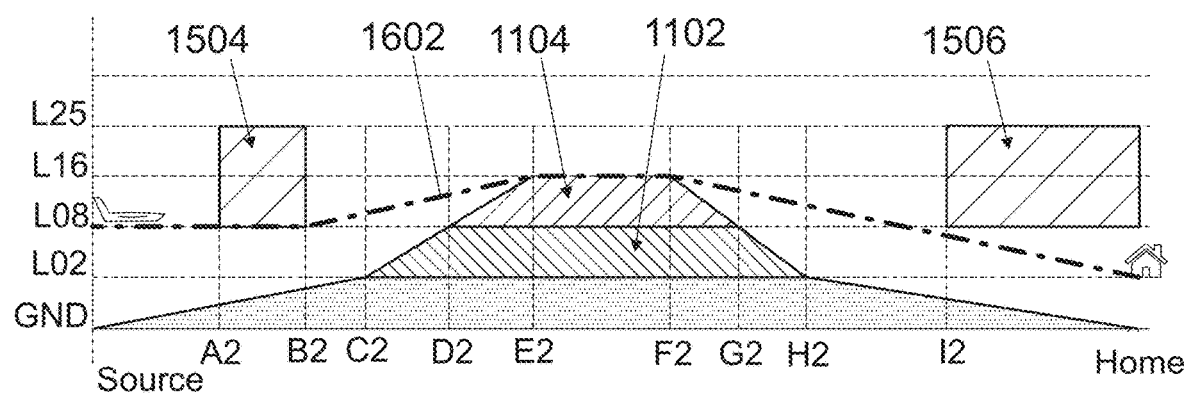
FIG. 16B illustrates a vertical scenario and a valid vertical path for the second group.

In FIG. 16B, the vertical scenario corresponding to FIG. 16A is represented where the UAV 302 can move between 200 m and 1600 m of altitude. Then, by applying the 2D shortest path techniques, the dash-dot line 1602 is obtained.

A third group with altitude layers 200 m, 800 m, 1600 m, and 2500 m. This scenario provides a 3D path in which the UAV 302 can move between 200 and 2500 meters of altitude.

Composition of 3D Waypoints for the Second Group of Layers

As in previous cases, having computed 2D lateral and vertical paths, the 3D path is made up by the following 3D waypoints: (S, 800), (B2,800), (E2, 1600), (F2, 1600), (H, 200).

The table below shows more details:

| Point from | Point to | length [m] | delta altitude [m] | $(l_i + \Delta h_i \cdot f)$ |
|---|---|---|---|---|
| S | B2 | 13127 | 0 | 13127 |
| B2 | E2 | 14363 | 800 | 22363 |
| E2 | F2 | 8080 | 0 | 8080 |
| F2 | H | 25545 | −1400 | 18545 |

$$UPI = \frac{\sum_{i=1}^{n}(l_i + \Delta h_i \cdot f)}{l_n} = 1.2423$$

Thus, the resulting UPI for this scenario is 1.24 (rounded down from 1.2423). This is a worse option than the previous one, despite lateral path being slightly shorter (61.1 km vs 62.7 km). An additional climb of 800 m is required, which penalizes the overall solution. As apparent, this is a particular result and depends on the user defined bonus and penalization factors for descend and climb segments respectively.

Preparation of Horizontal Scenario for the Third Group of Layers

Figure 17A:
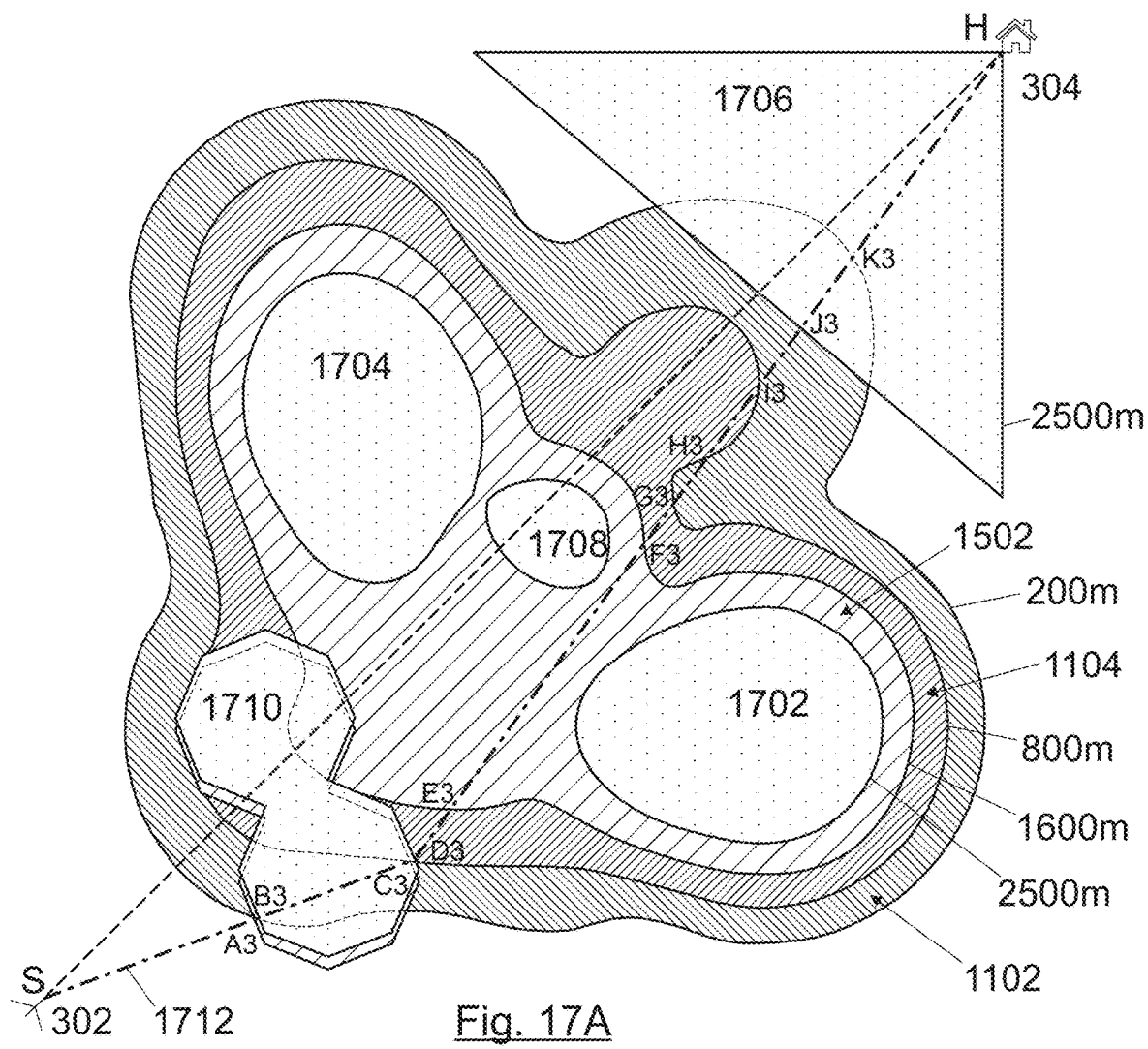
FIG. 17A illustrates a horizontal scenario and a valid lateral path for the third group.

The next layer combination to search for RTL path is made up by layers at altitudes 200 m, 800 m, 1600 m, and 2500 m. FIG. 17A shows the processed horizontal scenario with existing constraints at each of these layers. Shape 1102 represents 200 m sections, shape 1104 represents 800 m sections, shape 1502 represents 1600 m sections. Shapes 1702, 1704, 1706, 1708 and 1710 represents 2500 m sections. The 2D shortest lateral path results in the dash-dot line 1712 that covers the segments S-A3-B3-C3-D3-E3-F3-G3-H3-I3-J3-K3-H. Note that each of the points is the intersection of the path with the polygons that make up the scenario.

Preparation of Vertical Scenario for the Third Group of Layers

Figure 17B:
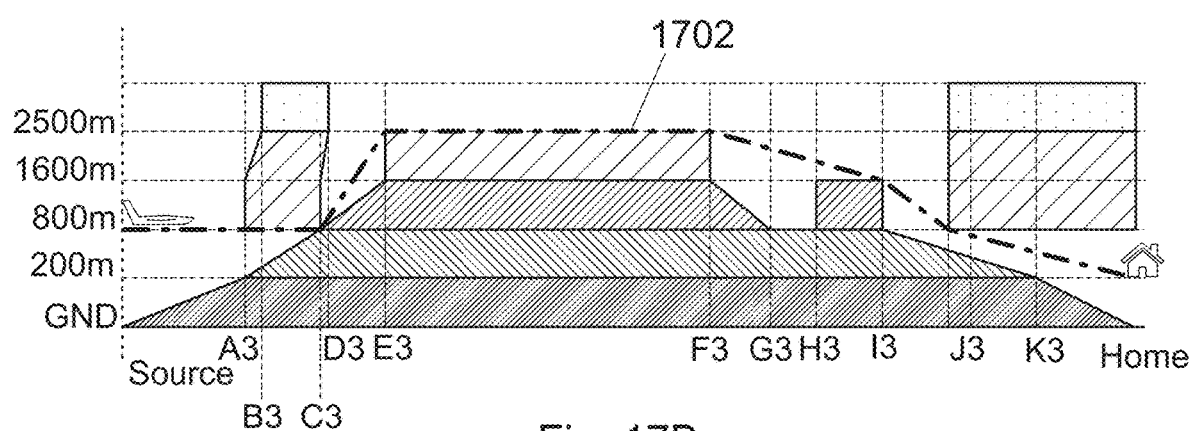
FIG. 17B illustrates a vertical scenario and a valid vertical path for the third group.

In FIG. 17B, the vertical scenario corresponding to FIG. 17A is represented as in previous cases and the dash-dot line 1702 is obtained.

Composition of 3D Waypoints for the Third Group of Layers

The resulting 3D path is made up by the following 3D waypoints: (S, 800), (D3,800), (E3, 2500), (F3, 2500), (I3, 1600), (J3,800), (H, 200). Again, the metric UPI is calculated in the table below:

| Point from | Point to | length [m] | delta altitude [m] | $(l_i + \Delta h_i \cdot f)$ |
|---|---|---|---|---|
| S | D3 | 14477 | 0 | 14477 |
| D3 | E3 | 2446 | 1700 | 19446 |
| E3 | F3 | 12283 | 0 | 12283 |
| F3 | I3 | 7144 | −900 | 2644 |
| I3 | J3 | 2731 | −800 | −1269 |
| J3 | H | 12666 | −600 | 9666 |

$$UPI = \frac{\sum_{i=1}^{n}(l_i + \Delta h_i \cdot f)}{l_n} = 1.14494$$

The resulting UPI for this scenario is 1.14 (rounded down from 1.14494), which means that this is the best path. Despite the need to climb up to 1700 meters above the current UAV level, the lateral path is significantly shorter than any of the other two previous scenarios (51.7 km vs 61.1 km and 62.7 km). Again, it has to be noted that this particular result depends on the user defined bonus and penalization factors for descend and climb segments respectively, other values may lead to very different results.

Figure 18:
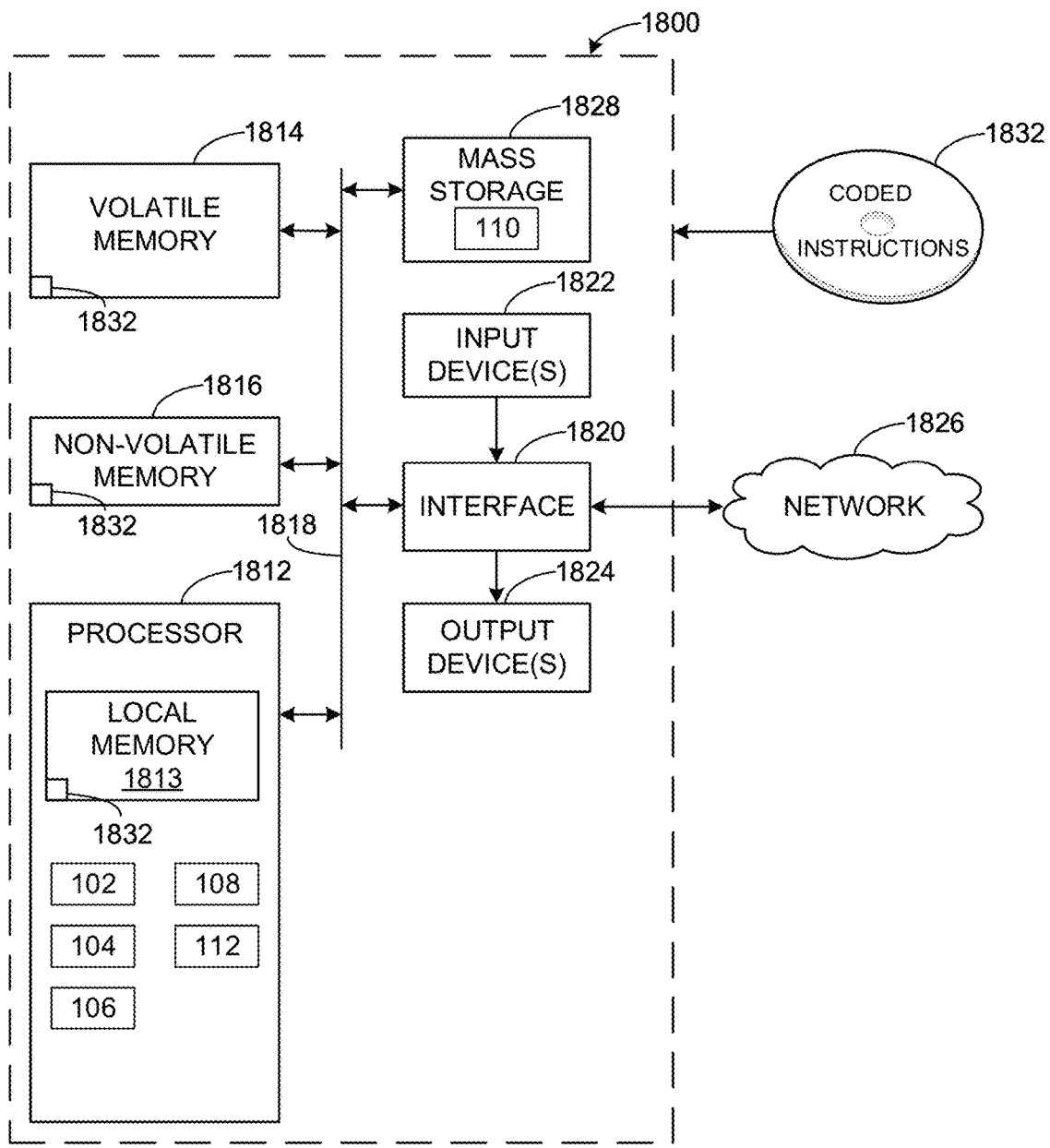
FIG. 18 is a block diagram of an example processing platform structured to execute the instructions of FIG. 2 to implement the system of FIG. 1.

FIG. 18 is a block diagram of an example processor platform 1800 structured to execute the instructions of FIG. 2 to implement the system 100 of FIG. 1. The processor platform 1800 can be, for example, a server, an industrial computer, or any other type of computing device.

The processor platform 1800 of the illustrated example includes a processor 1812. The processor 1812 of the illustrated example is hardware. For example, the processor 1812 can be implemented by one or more integrated circuits, logic circuits, microprocessors, GPUs, DSPs, or controllers from any desired family or manufacturer. The hardware processor may be a semiconductor based (e.g., silicon based) device. In this example, the processor 1812 implements the managing unit 102, the path computing unit 104, the navigation unit 106, the user preferences unit 108, and the DTEM 112 of FIG. 1.

The processor 1812 of the illustrated example includes a local memory 1813 (e.g., a cache). The processor 1812 of the illustrated example is in communication with a main memory including a volatile memory 1814 and a non-volatile memory 1816 via a bus 1818. The volatile memory 1814 may be implemented by Synchronous Dynamic Random Access Memory (SDRAM), Dynamic Random Access Memory (DRAM), RAMBUS® Dynamic Random Access Memory (RDRAM®), and/or any other type of random access memory device. The non-volatile memory 1816 may be implemented by flash memory and/or any other desired type of memory device. Access to the main memory 1814, 1816 is controlled by a memory controller.

The processor platform 1800 of the illustrated example also includes an interface circuit 1820. The interface circuit 1820 may be implemented by any type of interface standard, such as an Ethernet interface, a universal serial bus (USB), a Bluetooth® interface, a near field communication (NFC) interface, and/or a PCI express interface.

In the illustrated example, one or more input devices 1822 are connected to the interface circuit 1820. The input device(s) 1822 permit(s) a user to enter data and/or commands into the processor 1812. The input device(s) 1822 can be implemented by, for example, an audio sensor, a microphone, a camera (still or video), a keyboard, a button, a mouse, a touchscreen, a track-pad, a trackball, an isopoint device, and/or a voice recognition system.

One or more output devices 1824 are also connected to the interface circuit 1820 of the illustrated example. The output devices 1824 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer, and/or speaker. The interface circuit 1820 of the illustrated example, thus, typically includes a graphics driver card, a graphics driver chip, and/or a graphics driver processor.

The interface circuit 1820 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1826. The communication can be via, for example, an Ethernet connection, a digital subscriber line (DSL) connection, a telephone line connection, a coaxial cable system, a satellite system, a line-of-site wireless system, a cellular telephone system, etc. The processor platform 1800 of the illustrated example also includes one or more mass storage devices 1828 for storing software and/or data. Examples of such mass storage devices 1828 include floppy disk drives, hard drive disks, compact disk drives, Blu-ray disk drives, redundant array of independent disks (RAID) systems, and digital versatile disk (DVD) drives. In this example, the one or more mass storage devices 1828 implements the operational context database 110.

The machine executable instructions 1832 of FIG. 2 may be stored in the mass storage device 1828, in the volatile memory 1814, in the non-volatile memory 1816, and/or on a removable non-transitory computer readable storage medium such as a CD or DVD.

As mentioned, the present disclosure considers lateral and vertical paths and makes use of European patent application EP15382365, which introduces techniques for guiding a vehicle from a source to a destination within a 2D scenario with constraints. The 2D scenario may relate to a horizontal or vertical representation. Broadly, the constraints may be obstacles, no-flying zones, restricted areas and the like. In order to build a valid 2D path around constraints, the following operations can be implemented:
 the source is considered a starting point;
 a sub-path (e.g. a segment) from the starting point to the destination is computed;
 it is detected if there are constraints that cross the computed sub-path;
 repeatedly, for the first detected constraint crossing the computed sub-path, alternative sub-paths are computed, so that the alternative sub-path is conflicts-free and connects the starting point to a certain waypoint of an outer boundary of the detected constraint;
 a priority value for each waypoint is computed, preferably, based on:
  the distance between the waypoint and the destination and
  the accumulated distance from the source to the waypoint, wherein accumulated distance comprises at least the distance between the starting point and the ending point of at least one computed obstacle-free sub-path from the source to the waypoint, said distance being defined according to a pre-established metric;
 each waypoint and its corresponding priority is stored in a list of potential waypoints;
 the highest priority waypoint in the list is selected as a new starting point and the previous operations are repeated until the destination is reached;
 a valid path is obtained by backtracking waypoints from the destination to the source. This 2D path is also optimal according to the pre-established metric.

A representation with polygons for modelling constraints and common tangents (e.g., common tangent lines) helps simplify implementation leading to lower computation times. It is to be understood that a common tangent is a line touching the geometrical figure such that the whole figure lies to the same side of the line. In case of polygons, finding common tangents can be viewed as finding extreme vertices of the polygon. These techniques dramatically reduce the complexity of computations and allow deployment in real-time applications.

The present disclosure specifically offers a real improvement for planning mission, risk management procedures, and guidance capabilities for AVs, unmanned or not. As apparent to those skilled in the art, the present teachings can be implemented with modifications in various aspects.

The invention claimed is:

1. A system for generating a 3D path from a source to a destination for an aerial vehicle (AV), the system comprising:
 a managing unit to:
  retrieve a group of altitude layers, the group including an initial altitude layer and a final altitude layer, the initial altitude layer including the source, the final altitude layer including the destination, the altitude layers corresponding to 2-D horizontal planes;
  generate a 2D horizontal scenario based on the group, the 2D horizontal scenario to identify one or more constraints to avoid within a respective vertical range of the group;
 a path computing unit to:
  determine whether at least one of the one or more constraints are common constraints for the group; and
  compute a 2D lateral path avoiding ones of the common constraints;
 the managing unit to generate a 2D vertical scenario based on a projection of the 2D lateral path onto the one or more constraints at ones of the group;
 the path computing unit to compute a 2D vertical path; and
 the managing unit to:
  determine if a conflict-free 3D path can be generated based on the 2D lateral path and the 2D vertical path, wherein, in response to the conflict-free 3D path not being able to be generated, at least one additional altitude layer between the initial altitude layer and the final altitude layer is to be added to the group until the conflict-free 3D path is able to be generated;
  compose, in response to the conflict-free 3D path being able to be generated, 3D waypoints of the conflict-free 3D path based on the 2D lateral path and the 2D vertical path; and
  cause the AV to move along a trajectory based on the 3D waypoints.

2. The system of claim 1, wherein the managing unit is to generate the 2D horizontal scenario by accessing at least one of an operational context database or a digital terrain elevation model.

3. The system of claim 1, further including a user preferences unit to evaluate a 3D metric based on at least one of an estimated flight time between consecutive 3D waypoints or a distance and altitude difference between consecutive 3D waypoints, and to communicate a result based on evaluating the 3D metric to the managing unit.

4. The system of claim 3, wherein the managing unit is to include the additional altitude layer in the group according to the result of the 3D metric evaluation.

5. The system of claim 1, wherein, upon receiving a Pilot-In-Command's instruction or an emergency event notification during flight of the AV, the managing unit is to trigger a safe 3D path by changing the destination to a landing location.

6. The system of claim 5, wherein according to the emergency event notification, the managing unit is to communicate with a navigation unit to obtain a current location of the AV and identify the current location as the source.

7. The system of claim 1, wherein the path computing unit is to compute a 2D path by:
  establishing the source as a starting point;
  computing a sub-path from the starting point to the destination;
  detecting if a constraint crosses the computed sub-path;
  repeatedly, for a detected constraint crossing the sub-path, computing a plurality of obstacle-free sub-paths avoiding the detected constraint, each obstacle-free sub-path connecting the starting point to a waypoint of an outer boundary of a detected constraint;
  computing a priority value for each waypoint, the priority value is computed based on a distance between the waypoint and the destination and an accumulated distance from the source to the waypoint, the accumulated distance including at least the distance between a starting point and an ending point of at least one computed obstacle-free sub-path from the source to the waypoint, the distance being defined according to a 2D metric;
  storing each waypoint and its corresponding priority in a list of potential waypoints;
  selecting the highest priority waypoint in the list as a new starting point and repeating previous steps until the destination is reached; and
  obtaining an optimal 2D path by backtracking waypoints from the destination to the source.

8. A method for generating a 3D path from a source to a destination for an aerial vehicle (AV), the method comprising:
  retrieve a group of altitude layers including an initial altitude layer and a final altitude layer, the initial altitude layer including the source, the final altitude layer including the destination, the altitude layers corresponding to 2-D horizontal planes;
  generating a 2D horizontal scenario based on the group, the 2D horizontal scenario to identify one or more constraints to avoid within a respective vertical range of ones of the group;
  determining whether at least one of the one or more constraints are common constraints for the the group;
  computing a 2D lateral path, the 2D lateral path to avoid the common constraints;
  generating a 2D vertical scenario based on a projection of the 2D lateral path onto the one or more constraints at ones of the group;
  computing a 2D vertical path;
  determining if a conflict-free 3D path can be generated based on the 2D lateral path and the 2D vertical path, wherein, in response to the conflict-free 3D path not being able to be generated, at least one additional altitude layer between the initial altitude layer and the final altitude layer is to be added to the group until the conflict-free 3D path is able to be generated;
  composing, in response to the conflict-free 3D path being able to be generated, 3D waypoints based on the 2D lateral path and the 2D vertical path; and
  causing the AV to move along a trajectory based on the 3D waypoints.

9. The method of claim 8, further including evaluating a metric based on at least one of an estimated flight time between consecutive 3D waypoints or a distance and altitude difference between consecutive 3D waypoints, and selecting the at least one additional altitude layer based on the evaluation of the metric.

10. The method of claim 8, wherein generating the 2D horizontal scenario is based on accessing at least one of an operational context database or a digital terrain elevation model.

11. The method of claim 8, further including, in response to receiving a Pilot-In-Command's instruction or an emergency event notification during flight of the AV, triggering a safe 3D path by changing the destination to a landing location.

12. The method of claim 11, further including, in response to the emergency event notification, communicating with a navigation unit to obtain a current location of the AV and identify the current location as the source.

13. The method of claim 8, wherein the destination is a landing location for the AV and the source is a current location of the AV.

14. The method of claim 8, wherein computing the 2D path includes:
  establishing the source as a starting point;
  computing a sub-path from the starting point to the destination;
  detecting if a constraint crosses the computed sub-path;
  repeatedly, for a detected constraint crossing the sub-path, computing a plurality of obstacle-free sub-paths avoiding the detected constraint, each obstacle-free sub-path connecting the starting point to a waypoint of an outer boundary of a detected constraint;
  computing a priority value for each waypoint, the priority value is computed based on a distance between the waypoint and the destination and an accumulated distance from the source to the waypoint, the accumulated distance including at least the distance between a starting point and an ending point of at least one computed obstacle-free sub-path from the source to the waypoint, the distance being defined according to a 2D metric;
  storing each waypoint and its corresponding priority in a list of potential waypoints;
  selecting the highest priority waypoint in the list as a new starting point and repeating previous steps until the destination is reached; and
  obtaining an optimal 2D path by backtracking waypoints from the destination to the source.

15. The method of claim 14, wherein the one or more constraints are modelled based on polygons, and further including obtaining the waypoints based on an intersection of one of one or more common tangent lines to one of the polygons, the one of the polygons corresponding to one of the one or more constraints.

16. A non-transitory computer readable storage medium comprising instructions which, when executed, cause a machine to at least:
  retrieve a group of altitude layers including an initial altitude layer and a final altitude layer, the initial altitude layer including a source for an aerial vehicle, the final altitude layer including a destination for the aerial vehicle, the group corresponding to 2-D horizontal planes;
  select a plurality of altitude layers including at least the initial altitude layer and the final altitude layer;
  generate a 2D horizontal scenario based on the group, the 2D horizontal scenario to identify one or more constraints to avoid within a respective vertical range of ones of the group;
  determine whether one or more constraints are common constraints for the group;

compute a 2D lateral path, the 2D lateral path to avoid one or more common constraints of the 2D horizontal scenario;

generate a 2D vertical scenario based on a projection of the 2D lateral path onto the one or more constraints at ones of the group;

compute a 2D vertical path;

determine if a conflict-free 3D path can be generated based on the 2D lateral path and the 2D vertical path, wherein, in response to the conflict-free 3D path not being able to be generated, an additional altitude layer between the initial altitude layer and the final altitude layer is to be added to the group until the conflict-free 3D path is able to be generated;

compose, in response to the conflict-free 3D path being able to be generated, 3D waypoints based on the 2D lateral path and the 2D vertical path; and cause the aerial vehicle to move along a trajectory based on the 3D waypoints.

17. The non-transitory computer readable storage medium of claim 16, wherein the instructions, when executed, cause the machine to at least evaluate a metric based on an estimated flight time between consecutive 3D waypoints or a distance and altitude difference between consecutive 3D waypoints, and select the additional altitude layer based on evaluating the metric.

18. The non-transitory computer readable storage medium of claim 16, wherein the destination is a landing location for the aerial vehicle.

19. The non-transitory computer readable storage medium of claim 16, wherein the instructions, when executed, cause the machine to at least:

establish the source as a starting point;

compute a sub-path from the starting point to the destination;

detect whether a constraint crosses the sub-path;

repeatedly, for a detected constraint crossing the sub-path, compute a plurality of obstacle-free sub-paths avoiding the detected constraint, each obstacle-free sub-path connecting the starting point to a waypoint of an outer boundary of a detected constraint;

compute a priority value for each waypoint, the priority value is computed based on a distance between the waypoint and the destination and an accumulated distance from the source to the waypoint, an accumulated distance including at least the distance between a starting point and an ending point of at least one computed obstacle-free sub-path from the source to the waypoint, the distance being defined according to a 2D metric;

store each waypoint and its corresponding priority in a list of potential waypoints;

select the highest priority waypoint in the list as a new starting point and repeating previous steps until the destination is reached; and obtain an optimal 2D path by backtracking waypoints from the destination to the source.

20. The non-transitory computer readable storage medium of claim 19, wherein the one or more constraints are modelled based on polygons, and the instructions, when executed, cause the machine to at least determine the waypoints based on an intersection of one of one or more common tangent lines to one of the polygons, the one of the polygons corresponding to the one or more constraints.

* * * * *

UNITED STATES PATENT AND TRADEMARK OFFICE
CERTIFICATE OF CORRECTION

PATENT NO. : 11,080,929 B2  
APPLICATION NO. : 16/157766  
DATED : August 3, 2021  
INVENTOR(S) : Carlos Querejeta Masaveu et al.

Page 1 of 1

It is certified that error appears in the above-identified patent and that said Letters Patent is hereby corrected as shown below:

In the Claims

Column 17, Line 31, Claim 8, "retrieve" should be --retrieving--

Signed and Sealed this  
Fifteenth Day of February, 2022

Drew Hirshfeld  
*Performing the Functions and Duties of the*  
*Under Secretary of Commerce for Intellectual Property and*  
*Director of the United States Patent and Trademark Office*